United States Patent
Yamane et al.

(10) Patent No.: US 9,802,314 B2
(45) Date of Patent: Oct. 31, 2017

(54) SOFT BODY ROBOT FOR PHYSICAL INTERACTION WITH HUMANS

(71) Applicant: DISNEY ENTERPRISES, INC., Burbank, CA (US)

(72) Inventors: Katsu Yamane, Township of O'Hara, PA (US); Joohyung Kim, Pittsburgh, PA (US); Alexander Nicholas Alspach, Levittown, PA (US)

(73) Assignee: Disney Enterprises, Inc., Burbank, CA (US)

( * ) Notice: Subject to any disclaimer, the term of this patent is extended or adjusted under 35 U.S.C. 154(b) by 71 days.

(21) Appl. No.: 15/047,820

(22) Filed: Feb. 19, 2016

(65) Prior Publication Data
US 2017/0095925 A1 Apr. 6, 2017

Related U.S. Application Data

(60) Provisional application No. 62/235,806, filed on Oct. 1, 2015.

(51) Int. Cl.
*G06F 19/00* (2011.01)
*B25J 9/16* (2006.01)

(52) U.S. Cl.
CPC ... *B25J 9/1633* (2013.01); *G05B 2219/39319* (2013.01); *G05B 2219/40202* (2013.01)

(58) Field of Classification Search
CPC ....... B25J 9/1633; G05B 2219/393191; G05B 2219/40202

(Continued)

(56) References Cited

U.S. PATENT DOCUMENTS 5,445,235 A * 8/1995 Gomi ............... B25J 19/0075
180/8.1
6,088,017 A * 7/2000 Tremblay ............ G06F 3/011
345/156

(Continued)

FOREIGN PATENT DOCUMENTS

| WO | 2014138123 A1 | 9/2014 |
| WO | 2015073944 A2 | 5/2015 |
| WO | 2015102723 A2 | 7/2015 |

OTHER PUBLICATIONS

Choi, "New Hybrid Robot Has Soft "Skin" But Hard "Guts"," Live Science, Sep. 9, 2015, http://www.livescience.com/51511-hybrid-robot-soft-outside-hard-inside.html.

(Continued)

*Primary Examiner* — Ronnie Mancho
(74) *Attorney, Agent, or Firm* — Marsh Fischmann & Breyfogle LLP; Kent A. Lembke

(57) ABSTRACT

A robot designed for reducing collision impacts during human interaction. The robot includes a robot controller including a joint control module. The robot includes a link including a rigid support element and a soft body segment coupled to the rigid support element, and the body segment includes a deformable outer sidewall enclosing an interior space. The robot includes a pressure sensor sensing pressure in the interior space of the link. A joint is coupled to the rigid support element to rotate or position the link. During operations, the robot controller operates the joint based on the pressure sensed by the pressure sensor. The robot controller modifies operation of the joint from a first operating state with a servo moving or positioning the joint to a second operating state with the servo operating to allow the joint to be moved or positioned in response to outside forces applied to the link.

19 Claims, 24 Drawing Sheets

(58) Field of Classification Search
USPC .................................................. 700/245, 260
See application file for complete search history.

(56) References Cited

U.S. PATENT DOCUMENTS

| | | | | |
|---|---|---|---|---|
| 7,718,105 | B2 | 5/2010 | Tye et al. | |
| 8,909,370 | B2 | 12/2014 | Stiehl et al. | |
| 9,351,900 | B2* | 5/2016 | Walsh | A61H 1/024 |
| 2001/0014781 | A1* | 8/2001 | Nissim | A61H 7/001 |
| | | | | 601/133 |
| 2003/0031993 | A1* | 2/2003 | Pugh | G09B 23/30 |
| | | | | 434/262 |
| 2005/0166413 | A1* | 8/2005 | Crampton | B25J 13/088 |
| | | | | 33/503 |
| 2008/0082301 | A1 | 4/2008 | Haskell et al. | |
| 2009/0278798 | A1* | 11/2009 | Kim | G06F 3/011 |
| | | | | 345/158 |
| 2010/0081875 | A1* | 4/2010 | Fowler | A61B 1/00149 |
| | | | | 600/114 |
| 2010/0112537 | A1* | 5/2010 | Dobson | G09B 23/28 |
| | | | | 434/262 |
| 2010/0210939 | A1* | 8/2010 | Hartmann | A61B 5/062 |
| | | | | 600/424 |
| 2013/0078600 | A1* | 3/2013 | Fischer | G09B 19/00 |
| | | | | 434/236 |
| 2013/0109267 | A1 | 5/2013 | Schweikardt et al. | |
| 2013/0152724 | A1* | 6/2013 | Mozeika | B25J 17/00 |
| | | | | 74/490.05 |
| 2014/0165770 | A1* | 6/2014 | Abri | G06F 3/016 |
| | | | | 74/490.01 |
| 2014/0214206 | A1* | 7/2014 | Steinberg | G06F 3/016 |
| | | | | 700/258 |
| 2014/0238153 | A1 | 8/2014 | Wood et al. | |
| 2014/0318118 | A1 | 10/2014 | Mazzeo et al. | |
| 2015/0142153 | A1 | 5/2015 | Chun et al. | |
| 2015/0165625 | A1 | 6/2015 | Michalowski et al. | |
| 2015/0217459 | A1 | 8/2015 | Morin et al. | |
| 2015/0266186 | A1* | 9/2015 | Mosadegh | B25J 9/142 |
| | | | | 92/34 |

OTHER PUBLICATIONS

Gallagher, Here Come the Inflate-A-Bots: iRobot's AIR Blow-Up Bot Prototypes, Aug. 2012, http://arstechnica.com/information-technology/2012/08/here-come-the-inflate-a-bots-irobots-air-blow-up-bot-prototypes/.

Kim, et al, 3D Printed Soft Skin for Safe Human-Robot Interaction, Sep. 28, 2015.

McCaney, "DARPA-Funded Soft Robotics Program is a Big Hero," Nov. 14, 2014, Defense Systems, http://defensesystems.com/articles/2014/11/14/darpa-m3-carnegie-mellon-big-hero.aspx.

* cited by examiner

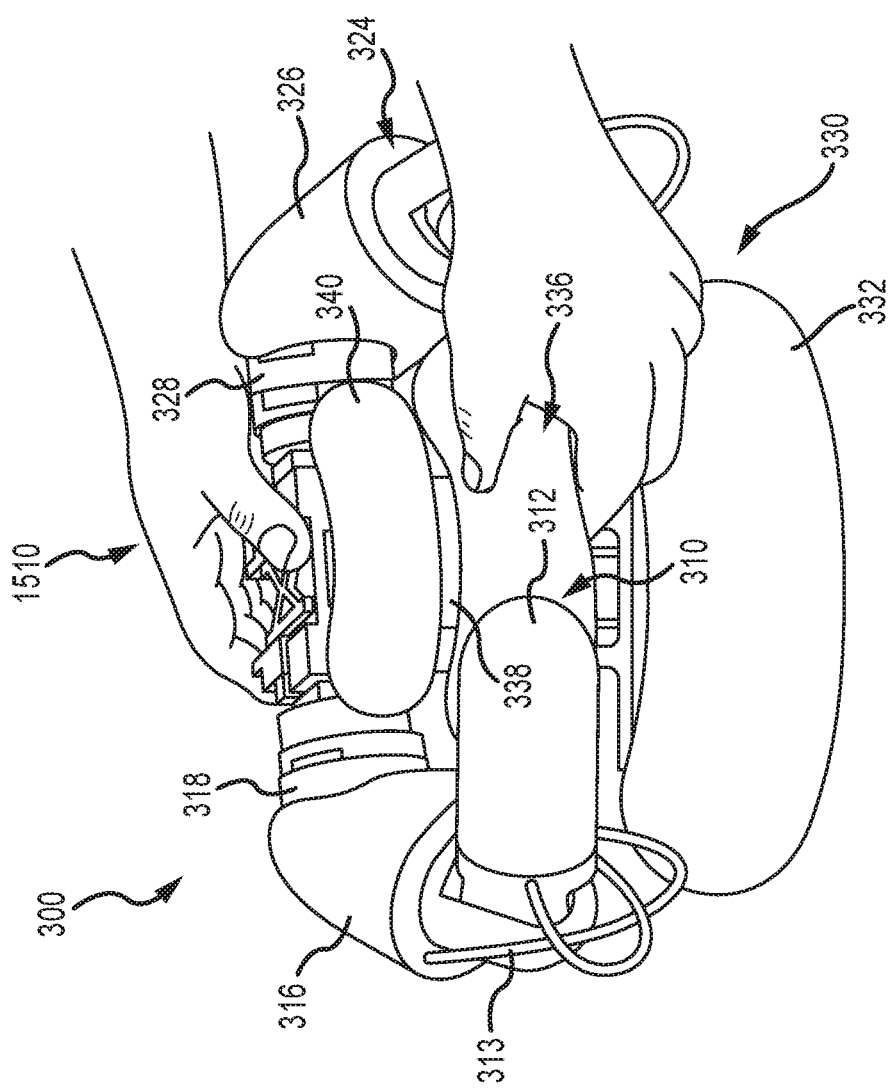

SOFT BODY ROBOT FOR PHYSICAL INTERACTION WITH HUMANS

CROSS-REFERENCE TO RELATED APPLICATIONS

This application claims the benefit of U.S. Provisional Application No. 62/235,806, filed Oct. 1, 2015, which is incorporated herein by reference in its entirety.

BACKGROUND

1. Field of the Description

The present description relates, in general, to design and control of robots including humanoid robots and other robots adapted for interaction with humans. More particularly, the present description relates to fabrication and control of a robot with one or more body parts (or segments or modules) that are particularly adapted for soft contact and/or interaction with a human.

2. Relevant Background

In order to interact with human environments, humanoid and other robots require safe and compliant control of the force-controlled joints. One way to achieve this goal is to equip the robot with torque-controlled joints, which have to be programmed to determine desired motions and output forces (contact forces) and, in response, to output joint torques to effectively control movement and positioning of the humanoid robot. However, it has proven difficult to provide wholly safe interactions between humans and robots simply by operating these humanoid and other robots with controlled movements.

As robotic systems become cheaper, more reliable, and more capable, their prevalence in our everyday environment continues to increase. Robots can be found providing interactive guidance or entertainment in stores and amusement parks and in more dynamic settings like homes, schools, hospitals, and the workplace where they teach, provide therapy, and lend an extra set of hands. In these more dynamic scenarios, robots and humans often work in close proximity where they physically interact with one another.

Where physical human and robot interaction is expected, it often is desirable for the robot's joints and body parts to be compliant and yielding to avoid injury and damage. For example, in nursing homes, a furry seal robot has been utilized that responds to being held and pet and helps to keep our older generations socially active and engaged. Another therapeutic robot features a sensorized silicone skin that covers its underlying mechanics. While these robots respond to touch in various ways, their motion is limited. More heavily actuated robot systems (e.g., humanoid robots) have been developed that have the ability to move with a wider variety of motions and employ soft, sensorized skins to ensure human safety during physical interaction. These robot skins can sense contact in high resolution, but they involve the use of complicated electronics. In contrast, other robots have been developed that use hard plastic shells and are adapted to work safely alongside humans by using series elastic actuators to sense contacts. This sensing method also allows users to teach the robot new tasks in a natural way by guiding its limbs and end effectors, thereby sharing their workload with the robot.

SUMMARY

The inventors recognized that there was a need for robots that can safely interact with humans and, particularly, with children. To physically interact with children, the inventors understood that the robot should be soft and durable. With this in mind, a robot physical and control design was created by the inventors with soft and deformable body parts (or modules, segments, or the like). To test this design, the inventors developed a small toy-sized robot with soft body parts (e.g., a soft skin), and the robot was robust to playful, physical interaction. The upper body, including the arms, pelvis, chest, and back, had a plurality of fluid-filled (e.g., filled with a liquid or with a gas such as air) body parts or segments, which were each formed using 3D printing. Each body part was connected to a pressure sensor to sense contact. A controller then operated the robot differently when contact was sensed at one or more of these soft body parts to provide protection to the child (or other outside actor) and robot during the interaction.

The skin, shell, or outer sidewall of each soft body part was relatively soft and used to cover the underlying actuators used to drive adjacent (e.g., upstream or downstream) joints and also cover the rigid robot support elements. For example, the soft body sidewall may enclose or cover actuators and rigid, 3D-printed frame components including printed bearings (e.g., all or a portion of an adjacent joint that may be allowed to freewheel or more freely pivot/rotate about an axis when a contact is sensed on a soft body part). In this description, the soft body robot is described in detail along with discussion of the design process of the soft body parts or modules. The description also provides exemplary control processes for this soft body robot including discussion of a demonstration with the prototype soft body robot demonstrating the efficacy of the soft body parts by implementing a "grab and move" user interface for posing the robot in a link-by-link manner.

The robot design combines passive and active compliance to enhance safety during human and robot interactions. While passive compliance can be realized using deformable materials, active compliance uses sensor data to react to both expected and unexpected contacts between the robot and its environment (e.g., with an interacting human or their property). A soft robot that senses contact, as described herein, integrates these passive and active approaches to ensure human safety during physical interaction.

A robot is designed particularly for reducing impacts on collision during human interaction. The robot includes a robot controller including a joint control module (e.g., software and/or hardware operated with a processor to provide particular functionality). The robot also includes a link including a rigid support element. A body segment is coupled to the rigid support element, and the body segment (or soft body part) includes an outer sidewall enclosing an interior space. The robot further includes a pressure sensor that senses pressure in the interior space of the link and also a joint coupled to the rigid support element. During operations, the robot controller operates (e.g., generates and transmits/communicates control signals) the joint based on the pressure sensed by the pressure sensor.

In some embodiments, the robot controller is configured to modify operation of the joint from a first operating state with a servo moving or positioning the joint to a second operating state with the servo operating to allow the joint to be moved or positioned in response to outside forces applied to the link. In these and other embodiments, the joint is upstream of the link in the robot (e.g., is a parent joint for the link). The outer sidewall is flexible (e.g., deformable under a human contact or under an outside compressive/contact force), whereby the interior space has a first volume in a pre-contact state and a second volume less than the first volume in a second state in which a contact force is applied to the outer sidewall. This change in volume is accompanied by an increase in pressure in the interior space. In some embodiments, the link further includes a deformation control member extending from the rigid support member to be positioned within the interior space to limit the magnitude of deformation of the outer sidewall (e.g., the link may include a rod or elongated stick with a rounded end or tip for contacting an inner surface of the outer sidewall during deformation).

In practice, the interior space is filled with a gas such as air, and the pressure measured or sensed by the pressure sensor is the pressure of the gas in the interior space, which increases from a non-contact value to a contact value (such as when a human contacts (e.g., squeezes) the outer sidewall of the link). The robot controller may operate the joint based on the pressure when the pressure exceeds a predefined threshold pressure value or when a change greater than a predefined pressure change is identified by the controller. The link may be fabricated as a single unit using a three dimensional (3D) printer (e.g., as part of a single printing process). The rigid support element may also include a connector for the pressure sensor providing a passageway to the interior space. Further, the joint may include a thrust bearing or a friction bearing that can be fabricated as a single unit using a 3D printer.

BRIEF DESCRIPTION OF THE DRAWINGS

FIGS. 15A-15F illustrate operation of robot of FIG. 3 through a prototype controller (or control method) of present description.

DETAILED DESCRIPTION OF THE PREFERRED EMBODIMENTS

Briefly, the present description is directed toward a robot with soft body parts (or segments, modules, or the like) that deform in response to human (and other) contact. These body parts may also be considered or labeled "gas-filled" or "air-filled." For example, the robot may have a soft forearm or chest that may deform, through non-elastic deformation, when a human or other outside actor applies a contact or compressive force on the forearm or chest. An outer wall or sidewall may be provided in each soft body part that defines or encloses an interior void or space, which may be filled with a gas such as a volume of air from the surrounding environment.

The robot includes a controller that acts to identify pressure changes in the interior void or space of the soft body part, and, when an identified pressure change exceeds a predefined threshold value or trigger amount, the controller acts to change the operations of the robot to reduce the impacts during operation. For example, the robot controller may cause an adjacent joint, upstream or downstream, to change its operating state from a motor/actuator driven state to a freewheeling state so that the contacted soft body part is free to move and will provide less (to no) resistance to the contacting force. In other examples, the affected joint may have an indirect (or no) coupling with the monitored and covered part and be a non-adjacent joint that is further upstream or downstream. For example, a torso joint may have its control affected by a measured pressure change in a hand. When the human or other outside actor stops applying the contact or compressive force, the controller may identify a return to "at-rest" or pre-contact pressures in the interior space of the soft body part, and the controller may then return the adjacent (or other non-adjacent) joint to its prior operating state (e.g., return to a driven operating or controlled state). Each soft body part may be similarly monitored with "upstream" or "downstream" joints (e.g., the elbow joint when the body part is the forearm, a knee joint when the body part is a lower leg module, and so on) each being controlled to provide safer operations when the downstream (or upstream)/adjacent (or non-adjacent) soft body part is compressed (or in contact with an interacting human).

Figure 1:
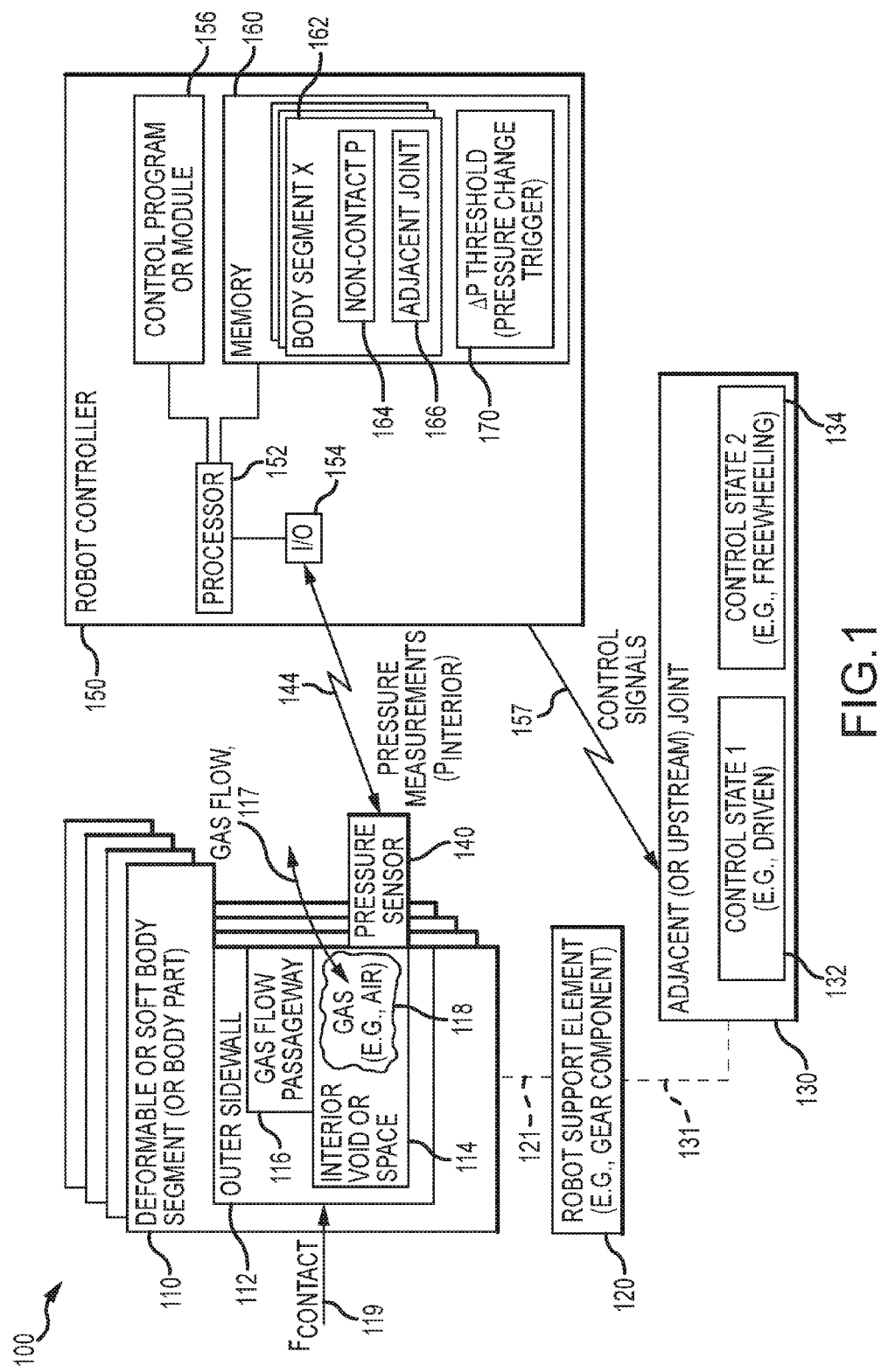
FIG. 1 is a functional block or schematic drawing of a robot of the present description including soft and/or deformable (e.g., non-elastic deformation) body parts.

FIG. 1 illustrates a robot 100 of the present description with a functional block or schematic diagram. As shown, the robot 100 includes one or more deformable or soft body segments or body parts (or modules) 110, such as in the shape of a forearm, a torso region, a leg portion, or the like. Each soft body part 110 includes an outer shell or sidewall 112 that encloses or defines with its inner surface an interior void or space 112 as well as defining the outer shape of the body part 110 with its outer surface. The outer sidewall 112 is coupled, as shown with dashed line 121, with a robot support element 120 (e.g., a gear component, a rigid link, or servo) and is supported upon and moves with this supported element 120.

The outer sidewall 112 includes a gas flow passageway 116 (or this may be provided at or via the joint with the robot support element 120) between the surrounding environment and the interior void/space 114. This passageway 116 allows the void/space 114 to fill with a volume of gas (e.g., air) when it is at rest or with no outer contact force as shown with arrow 119 being applied, and this defines a pre-contact or non-contact (or at rest) pressure for the interior space 114 that can be sensed by a pressure sensor 140, which functions to transmit the pressure readings ($P_{Interior}$) as shown with arrow 144 (in a wired or wireless manner) to the robot controller 150 for processing. When a human or other outside actor (not shown but understood in FIG. 1) contacts the outer surface of the sidewall, a contact force, $F_{Contact}$, 119 is applied that can deform the body part 110 causing an outflow of gas 118 as shown with arrow 117 through the passageway 116 as the interior void 114 is reduced in size. This also causes the pressure to change (i.e., increase) which is sensed by pressure sensor 140 and communicated as shown at 144 to the robot controller 150.

The robot 100 further includes an adjacent (typically, upstream) joint 130 that is coupled as shown with dashed line 131 with the robot support element 120 (note, though, that the joint 130 may be non-adjacent and may be coupled directly or indirectly or even non-coupled such as the torso joint of a robot being controlled based on compression of a hand joint such that having the joint 130 be an adjacent, upstream joint is only one useful but not limiting example). The joint 130 may be an actuator driven joint such as an elbow, shoulder, torso, leg, or other joint (note, the robot does not need to take a humanoid form and these joint names are provided as examples only for non-limiting humanoid robot embodiments of the robot 100). The joint 130 may have at least first and second operating or control states as shown with a first control state 132 and a second control state 134. The first control state 132 may be associated with the soft body part 110 experiencing no contact (no force 119) on the sidewall 112 while the second control state 134 may be associated with the time period when the contact force, $F_{Contact}$, 119 is applied at a magnitude that increases pressure in the interior void or space 114 over a threshold or trigger value (e.g., change in pressure exceeds a predefined value). In some embodiments, the first control state 132 involves the adjacent joint 130 being driven (or locked in place) via an actuator (not shown but understood in FIG. 1) while the second control state 134 involves the adjacent joint 130 being allowed to freewheel (or rotate freely about one or more axes), which also allows the robot support element 120 and coupled soft body part 110 to freewheel (note, in some embodiments, a portion of the joint 130 may still be fixed or move with the actuator while another portion linked as shown with dashed line 131 to the support element 120 is free to pivot or rotate to provide the freewheeling of the soft body part 110).

The robot 100 also includes a robot controller 150 with a processor(s) 152 managing operations of input/output devices (e.g., wired or wireless transceivers) to receive pressure measurement signals 144 from the pressure sensors 140 associated with each soft body part 110 and to transmit control signals 157 to each joint 130 (or to each driver/actuator (not shown) that drives or rotates the joint 130). The processor 152 also manages operations of and access to memory or memory devices (computer readable media or the like) 160. The memory 160 may store a record 162 for each of the soft body segments/parts, and, in each record 162, a non-contact pressure value 164 as well as an identification of an adjacent (e.g., upstream) joint 166 may be recorded or stored. Further, the memory 160 stores a pressure trigger (or threshold change of pressure value) 170 for individual body parts 110 or one value may be used for all body parts.

During operations, the robot controller 150 uses its processor 152 to run code/executable instructions (that may be provided in memory 160) to provide a control program 156. The control program 156 acts to provide control signals 157 to operate or drive each soft body part's upstream joint 130 in a first control state 132. The control program 156 also acts to process the pressure measurements 144 from each body part's pressure sensor 140 to determine its current interior pressure, $P_{Interior}$. The control program 156 further acts to determine a change in interior pressure (e.g., current pressure minus the non-contact pressure value 162) and compare this with the predefined threshold or trigger value 170. When a contact force 119 on a soft body part increases pressure above this threshold value 170, the control program 156 acts to transmit a control signal 157 to cause the adjacent (e.g., upstream) joint 130 to operate in a new or second control or operating state 134 that is safer during the application of the contact force 119 (e.g., when a human is applying a force on the robot's body part 110). This state 134 may involve causing the joint or a portion of the joint 130 to freewheel (or to operate so as to allow the support element 120 to freewheel or at least more freely rotate or not resist application of the force 119 (e.g., move/rotate in the direction of the applied force 119)).

Figure 2:
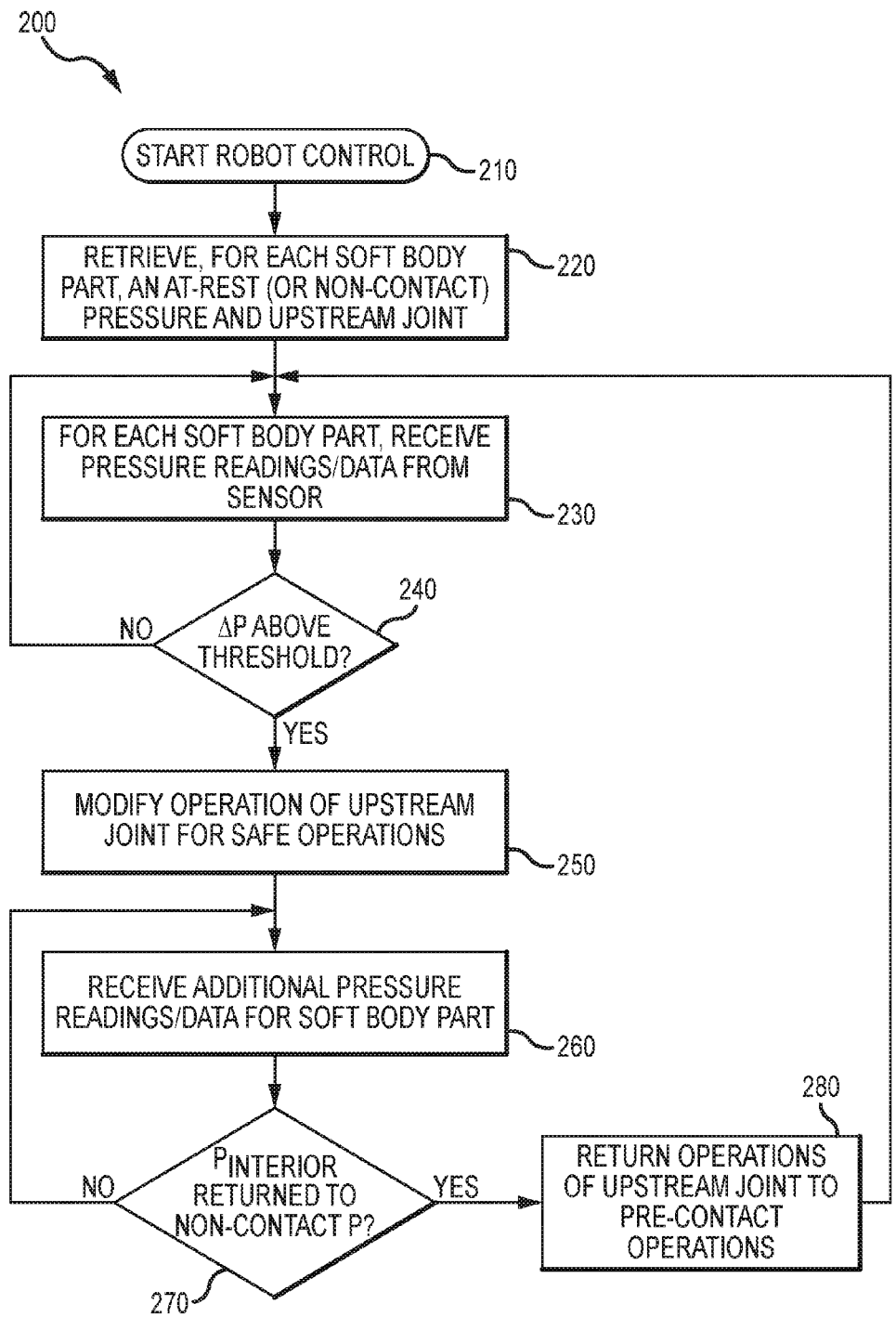
FIG. 2 illustrates a method for controlling a robot, such as the robot of FIG. 1, having soft body parts.

FIG. 2 illustrates a control method 200 for use with a robot of the present description (such as robot 100 of FIG. 1) with soft and/or deformable body parts. The method 200 starts at 210 such as with assembling a robot so as to have one-to-many soft body parts, and step 220 may include providing a pressure sensor for each soft body part that is adapted to determine pressures of gas (e.g., air) within the interior space of each of these soft body parts. The pressure sensors are communicatively linked with a controller of the robot (which is typically, but not necessarily, an onboard robot control device). Based on the soft body part designs, the amount of gas flow allowed through the flow passageway, safety restraints, pressure sensors chosen for use with the robot, and other parameters, step 210 may also include defining a pressure trigger or change in pressure threshold value for all or each of the soft body parts that will be used by the robot controller to trigger changes in operation of the robot to affect safer operations. The method 200 continues at 220 with retrieving, for each soft body part in the robot, an at-rest (or non-contact) pressure for the interior space defined by the outer sidewall. Further, step 220 includes identifying for each soft body part which joint (or link) is adjacent (e.g., upstream) of the soft body part or otherwise is to have its operations affected by monitoring of data from pressure sensors for the differing soft body parts.

The method 200 continues at 230 with receiving, for each of the soft body parts, pressure readings or data from the pressure sensors associated with each of these soft body parts. The robot controller acts to process these readings, and, at 240, the controller determines for each soft body part whether its interior pressure has had an increase greater than a threshold change (note, in some cases, the current pressure can be compared at 240 with a maximum pressure value to determine if a triggering event has occurred). If not, the method 200 continues at 230 with receiving additional pressure readings for the soft body part.

If the pressure change (or new pressure) is above the threshold value, the method 200 continues at 250 with the robot controller generating a control signal that changes operation of the upstream link (or other joint/link that may be downstream and may or may not be an adjacent link) identified in step 220 to provide safer operations. For example, the operations may be changed from an actuator-driven state for the joint to a state in which the entire joint or a portion coupled with the support element attached to the soft body part is allowed to freely or more freely pivot or rotate about one or more axes (or to move in the direction of the applied force on the soft body part). The method 200 continues at 260 with the robot controller receiving and processing additional pressure readings/data for the soft body part. At step 270, the robot controller determines whether or not the pressure in the interior void/space of the soft body part has returned to the non-contact pressure (or a low/non-contact pressure range). If not, the method 200 continues at 260 with the upstream joint run in the second operating/control state and receiving additional pressure data/readings from the pressure sensor. If the pressure has reduced to this range or value, the method 200 then continues on to step 280 by the robot controller returning (via control signals to an actuator) operations of the upstream joint to pre-contact operations (e.g., to the first operating/control state in which an actuator/driver locks the link and/or drives its rotation/movements).

To verify usefulness of the soft body robot design and control method design, the inventors chose as one goal the realization of a small, toy-sized humanoid robot. This humanoid robot was configured to be soft and robust during playful physical interaction with children. This robot's locomotive style and other motions, as well as its physical form and kinematic structure, were modeled after a given animated character (e.g., a character from an animated film or television show). Compliant joints and soft links with integrated sensors were used for safety and interactivity. To reduce the time and effort necessary to build a full body sensory skin, the inventors developed a 3D printed fluid-filled (e.g., liquid or gas-filled (e.g., air-filled)), soft skin module (or body segment or body part). This module, when connected to a pressure sensor and simple electronics, provides contact force feedback and also passively absorbs impacts. In this description, a general methodology is developed and described for designing soft skin for robots with size and shape constraints.

Figure 3:
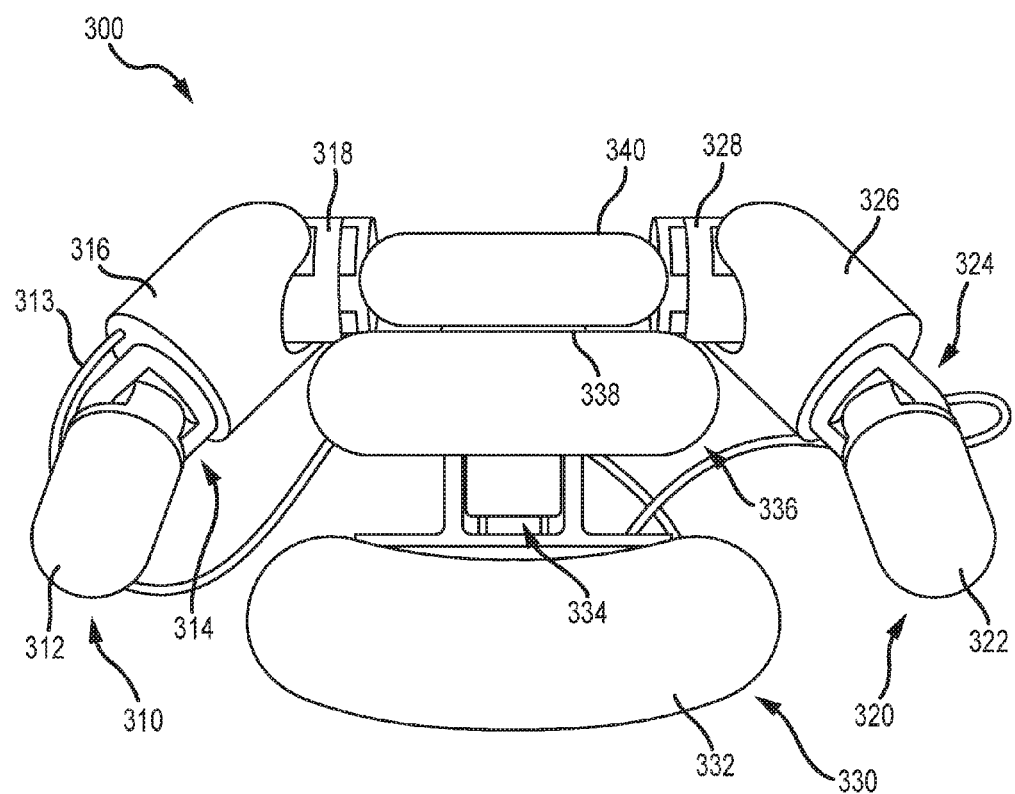
FIG. 3 illustrates a front view of an upper body of a soft body robot of the present description.

FIG. 3 illustrates a front view of a soft body robot 300 of the present description. The soft body robot 300 is humanoid with the upper body shown to include a right arm 310, a left arm 320, and a torso 330. The right arm 310 includes a forearm module or body part 312, an elbow joint 314, an upper arm module 316, and a shoulder joint 318, and the left arm 320 includes a forearm module or body part 322, an elbow joint 324, an upper arm module 326, and a shoulder joint 328. The modules or body parts 312, 316, 322, 326 include the deformable shells or outer sidewalls described with reference to FIG. 1. A sensor tube 313 is shown to run from the interior void or space of the forearm module 312, and the tube 313 allows the pressure (or pressure changes) in the module 312 to be sensed and used to operate the upstream joint 314 (e.g., to move from actuated movement to freewheeling upon sensing contact). Similarly, the torso 330 includes lower, middle, and upper modules 330, 336, 340 and torso joints (or upstream/adjacent joints) 334, 338 between these modules that are operated differently (e.g., to freewheel) upon sensing of contact to the modules 330 and 336 by measuring pressures in these air-filled, deformable body parts 330, 336.

The robot 300 of FIG. 3 shows the application of the inventors' design approach to the upper body design of an interactive robot character using soft skin modules (or body parts) on each of the robot's links (e.g., the forearm 312, the upper arm 316, and so on). These modules or body parts act as contact sensing bumpers, protecting both the human and the robot during interactions. The modules also include an underlying rigid frame (not visible/shown in FIG. 3) that actuates the robot and provides structural support. For example, 3D printed bearings were employed in a prototype of the robot 300 to reduce stress on the actuators during robot motion and physical interaction. The design of each module was chosen with a consideration of the range of motion for each joint so as to ensure that target animated motions could be recreated by the robot 300. A major benefit of use of 3D printed components (including the outer sidewall of each soft body part/module) is the ease by which they are reproduced and installed, which made it relatively simple to construct the interactive robot 300.

The following description discusses the considerations of animation data and physical interactivity in the design of the upper body robot 300. The design and implementation of the 3D printed, air-filled modules, and the 3D printed bearings are presented in detail. The implementation details for this robot (or similar robots) as well as experimental results are provided for an interactive "grab and move" interface for posing the robot.

Figure 4:
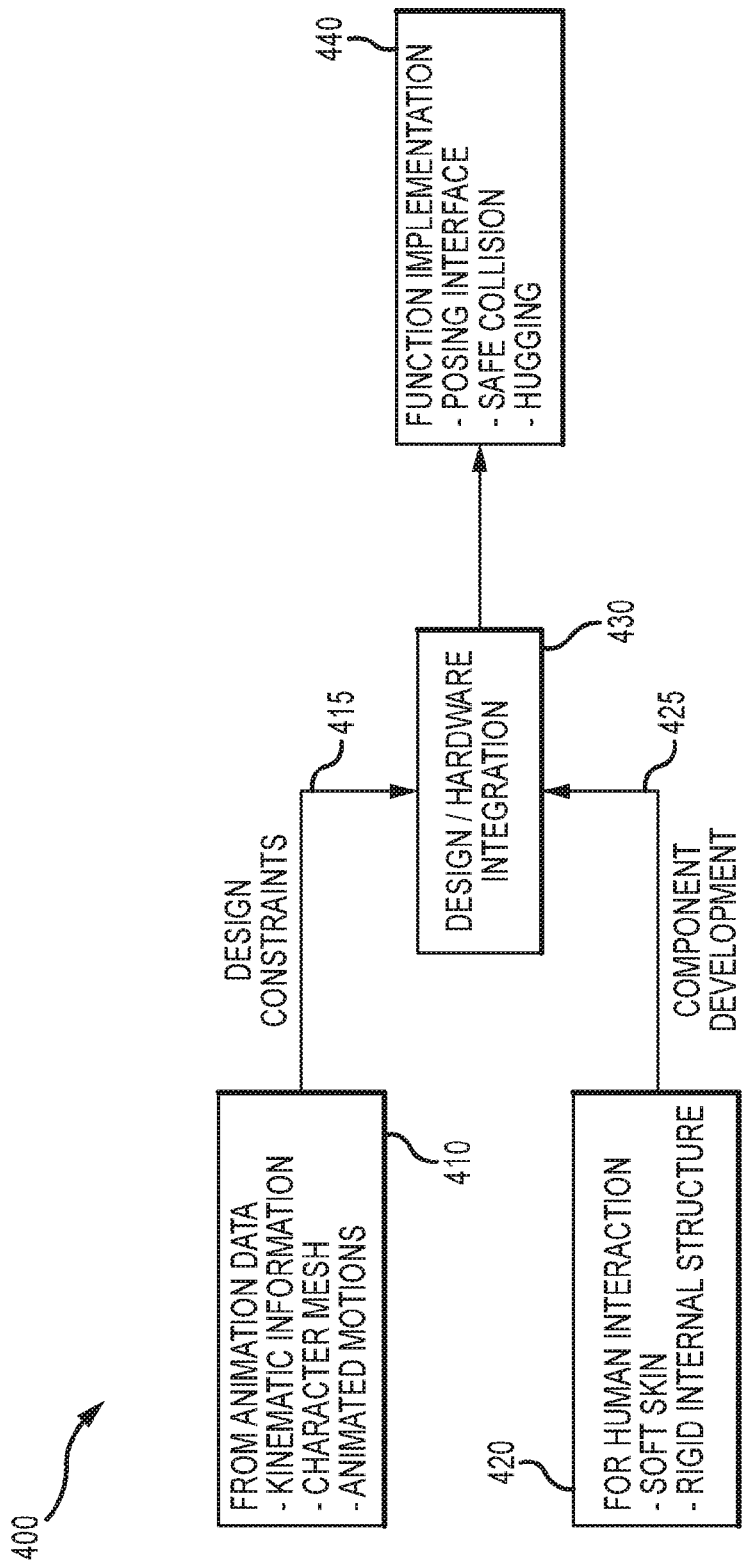
FIG. 4 illustrates a framework for designing mechanisms and interactive functions for a robot, which may be based on an animated character, with soft body parts.

Turning now to design considerations, when designing a robot that will move and physically interact like an animated character, the kinematics and form of the character are considered along with the desire for durability and safety. FIG. 4 illustrates a framework 400 for designing the robot's mechanisms and physical interactivity. The framework 400 includes at box/step 410 processing the animation data for a character to obtain kinematic information, a character mesh (or mesh data), and animated motions, and the result as shown at 415 is a set of design constraints. At box/step 420, human interaction data or goals are processed to obtain component development constraints 425 including a soft skin (or soft body parts) and a rigid internal structure. These inputs 415, 425 are taken as input to box/step 430 that involves design and hardware constraints/parameters integration. The output of step/box 430 is used while performing the step/box 440 of function implementation including providing a posing interface, providing soft collisions, and facilitating hugging (or soft human interaction). The framework 400 integrates the animated character data and the desired interactive functionalities to guide the development of a soft, modular robot that is huggable and interactive.

Figure 5:
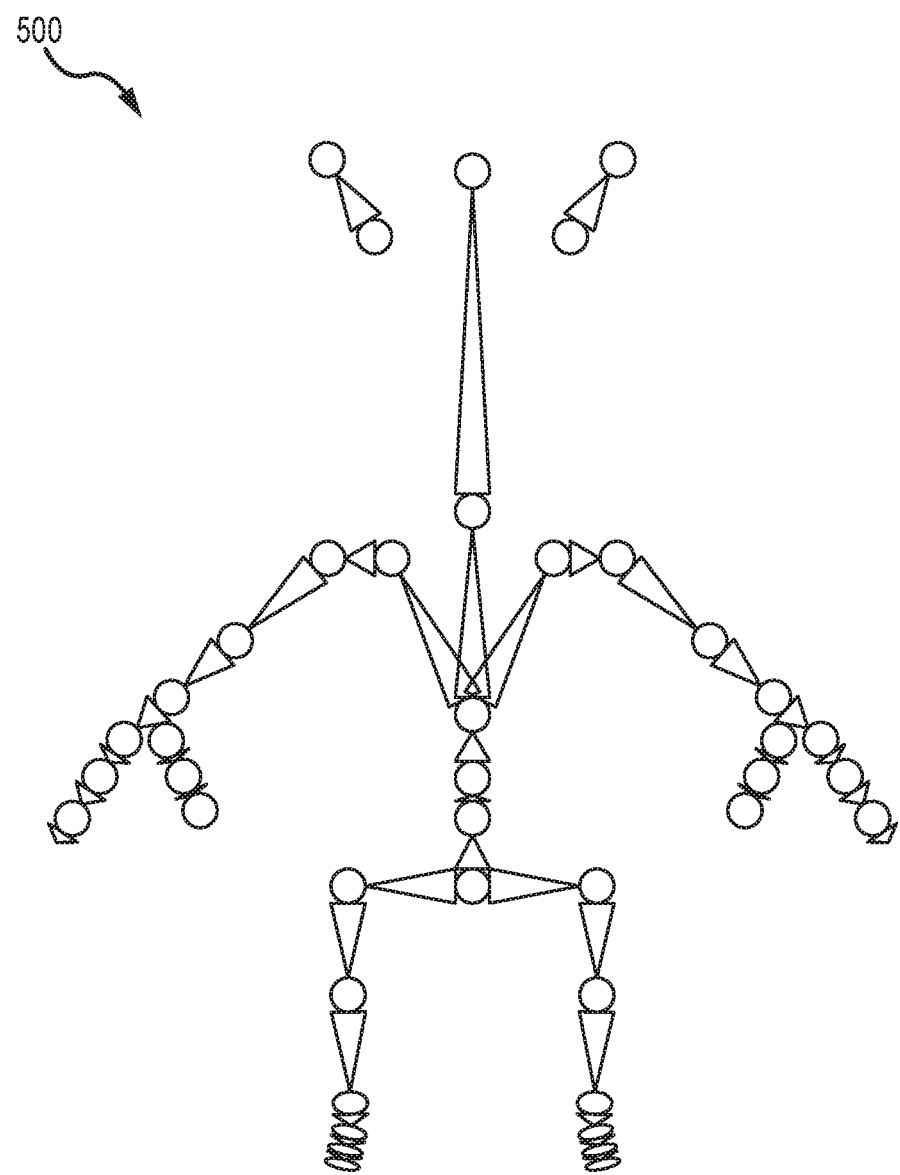
FIGS. 5 and 6 illustrate, respectively, graphical representations of a set of kinematic information and a set of mesh data obtained from a digital model of an animated (or other) character used in designing a soft body robot.

With regard to animation data constraints, the skeleton structure of an animated character can be extracted from a given digital model such as a Maya model. An exemplary skeleton or kinematic structure 500 is shown in FIG. 5 as may be extracted from a digital model of an animated or other base character used to design a soft body robot. As shown, each arm in this model has four joints: two in the shoulder, one elbow joint, and one wrist joint. The torso has four serial vertebral joints with one end connected to the middle of the pelvis and the other end connected to the middle of the pelvis and other end to the shoulder joints. There are also many joints in the hands. Further, every joint in the rig (e.g., Maya rig) 500 has three degrees of freedom (DOF).

Figure 6:
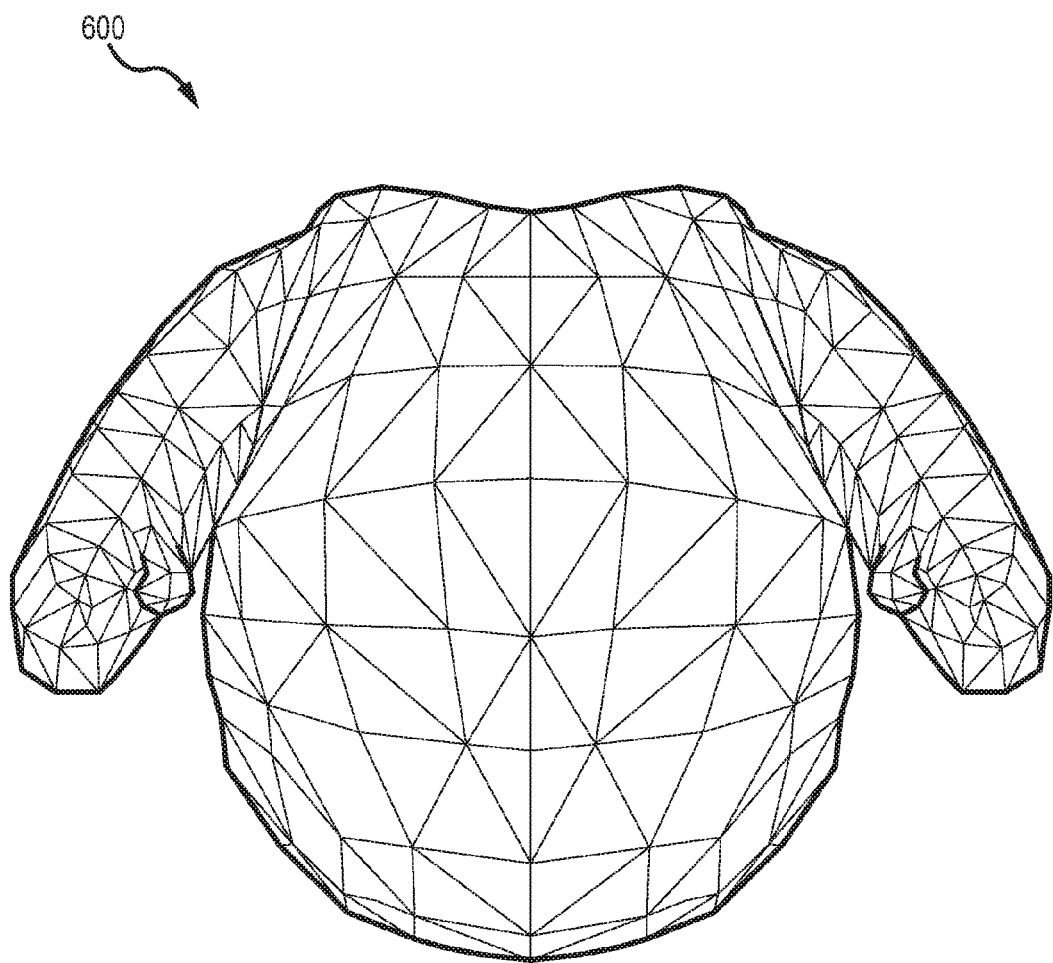

FIG. 6 illustrates graphically the set of mesh data 600 obtained from the animation or base data of a character. It is impractical to build hardware that has all of the DOFs of the animation model within the volume of the character shown with mesh data 600 in FIG. 6. Considering these factors, the robot hardware was designed to meet the following criteria: number of DOFs is physically realizable; the hardware dimensions are close to those of the animated character; and the range of motion allows its target motions to be realized. For a robot which will focus on human and robot interactive motions like hugging, actuated hands were considered unnecessary. The arm configuration, which as a 3-DOF shoulder joint and a 1-DOF elbow joint, can perform grasping and hugging motions. The torso has a 2-DOF pitch-yaw joint to make target motions such as crouching or arm swinging possible. Target lengths and corresponding hardware link lengths were similar or even matching.

As discussed above, the robot is designed specifically for physical human interaction. In this regard, it is desirable to provide soft skin and/or a soft body. Above all other design requirements is the requirement for safety. To this end, the robot may include 3D printed, soft skin modules or segments (or body parts), and these modules may include a flexible, contact-sensing, air-filled cavity (or void/interior space). The module helps to absorb unexpected impacts, reducing the likelihood of human injury and actuator damage. Further, the module provides contact force feedback via a pressure sensor connected to the air-filled cavity. When distributed over the body of the humanoid robot, these modules give the robot the ability to sense contact forces on its various links. Full body sensing allows for the implementation of engaging physical interactions. The independent sensing areas of the body allow a human to communicate with the robot through touch, drawing attention to certain links or guiding the motions of the robot.

Figure 7:
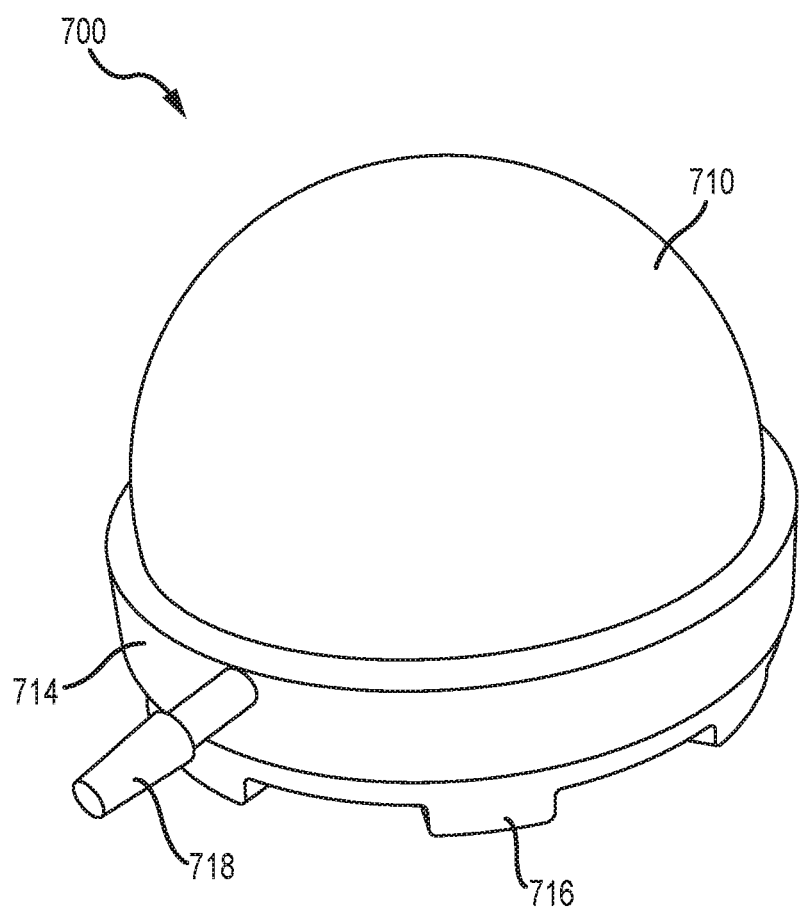
FIG. 7 illustrates a soft skin prototype for use as a soft body module or body part of a robot of the present description.

FIG. 7 illustrates a prototype air-filled module (or body part) 700 that was 3D printed. The module 700 includes an outer sidewall or shell 710 formed of a material that is deformable or soft that defines a semi-spherical cavity or void or interior space that is filled with air (or other gas) such as via a gas-permeable joint or seal with the support element 714. The support element 714 couples with the edges of the sidewall 710 and supports the sidewall 710 in the robot (when later assembled with the module or body part 700). The support element 714 typically is formed to be rigid and includes a bearing or other joint coupling member 716 (or side) for mating the module 710 with an adjacent or upstream joint. A nipple 718 is provided in the support element to provide a gas passageway to the interior space or cavity of the module 710 defined by or enclosed by the flexible sidewall 710, and a tube (not shown in FIG. 7) can be attached to the nipple 718 to couple the cavity/interior space with a pressure sensor (not shown in FIG. 7) for sensing pressure (and/or pressure changes) in the cavity or void.

Figure 8:
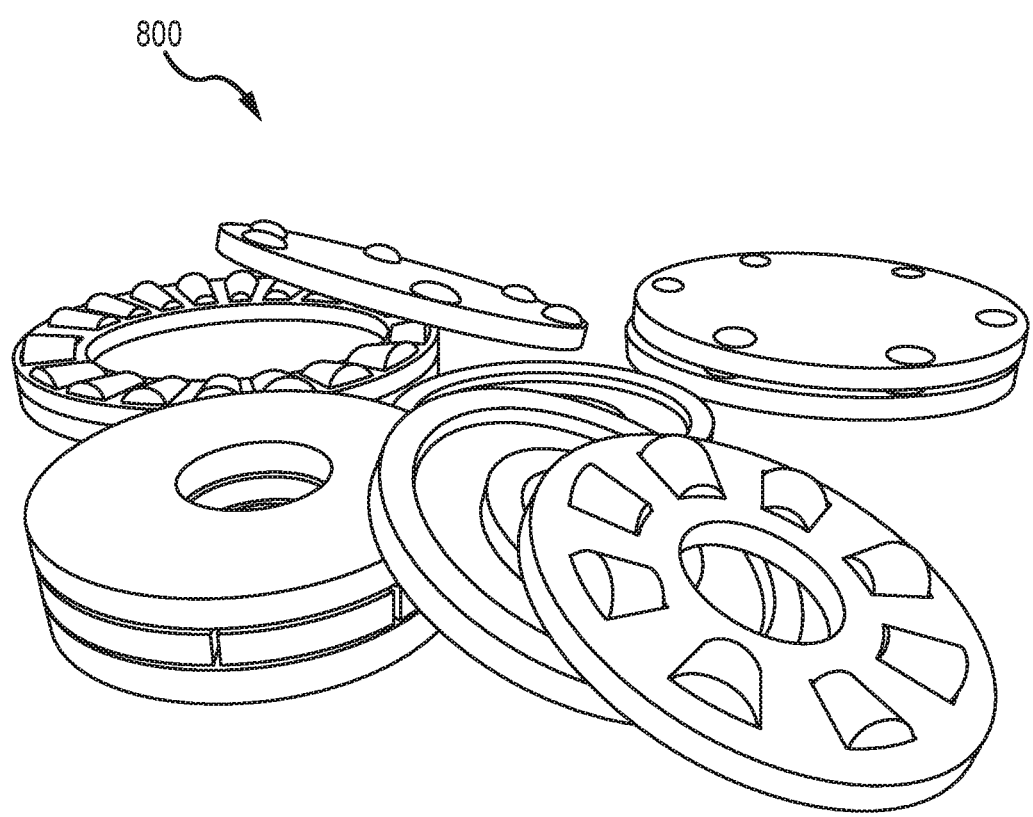
FIG. 8 illustrates thrust bearings that may be used in or for coupling with the soft body modules described herein such as the module in FIG. 7.

With regard to the rigid frame of the robot, an underlying support structure is used to provide a robot that can be lifted, played with, and dropped. Underneath the soft skin (provided by the outer sidewall of a module such as module 700), a rigid frame is provided and used to link the servos together. This frame also supports servo output shafts under loads experienced during motion and physical contact. In configurations where the servo's output is especially vulnerable, modular 3D printed bearings are used to constrain the motion and distribute loads. For example, FIG. 8 illustrates a set of exemplary 3D thrust bearings 800 that may be used as part of or to mate with the support element of a soft body module or part such as support element 714 of module 700 in FIG. 7 (e.g., to provide an upstream joint or part of one that may be driven by actuators or servos in a different manner when contact is sensed from when no contact is sensed with the link provided by the module 700).

Figure 9:
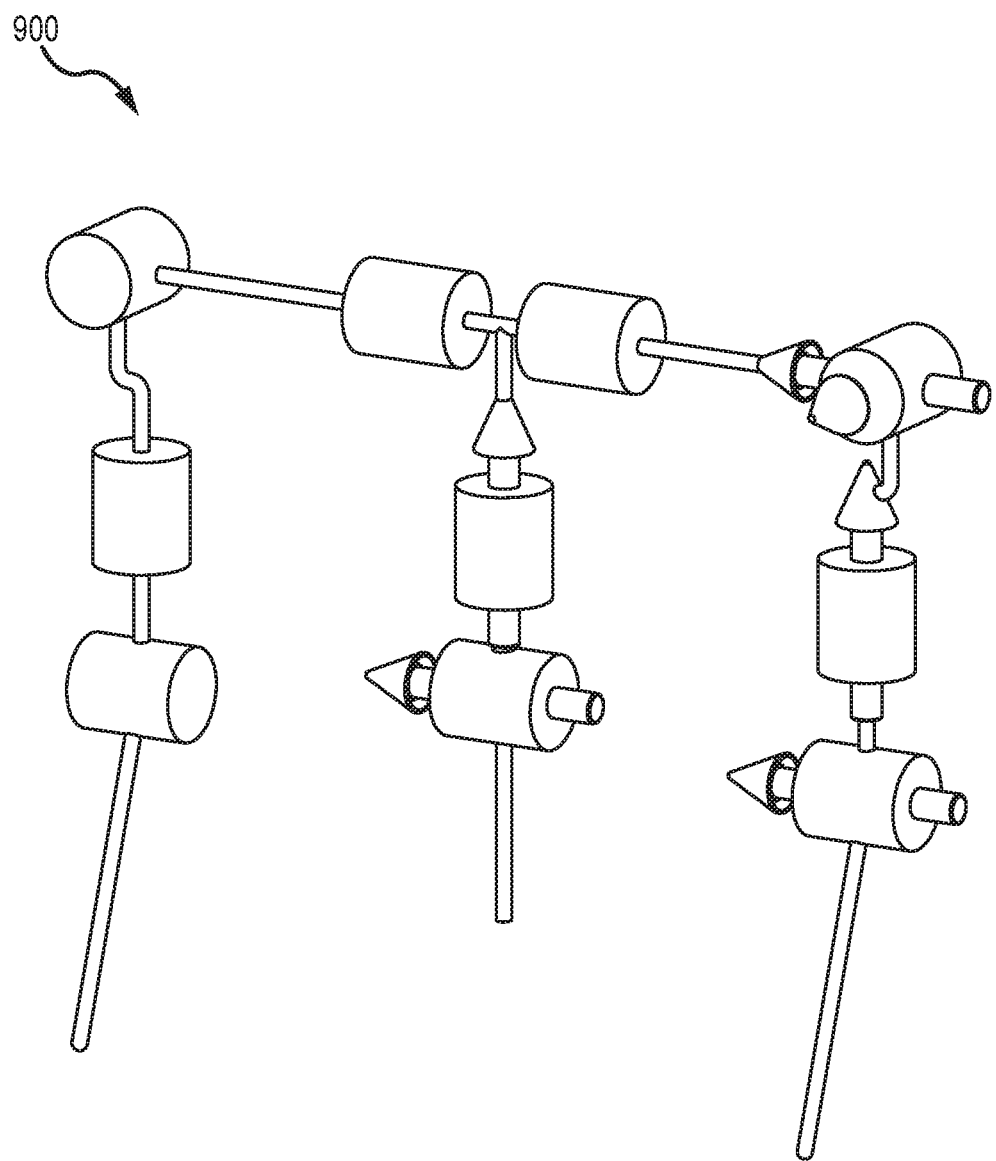
FIG. 9 illustrates a kinematic model of an exemplary upper body robot prototyped by the inventors.
Figure 10A:
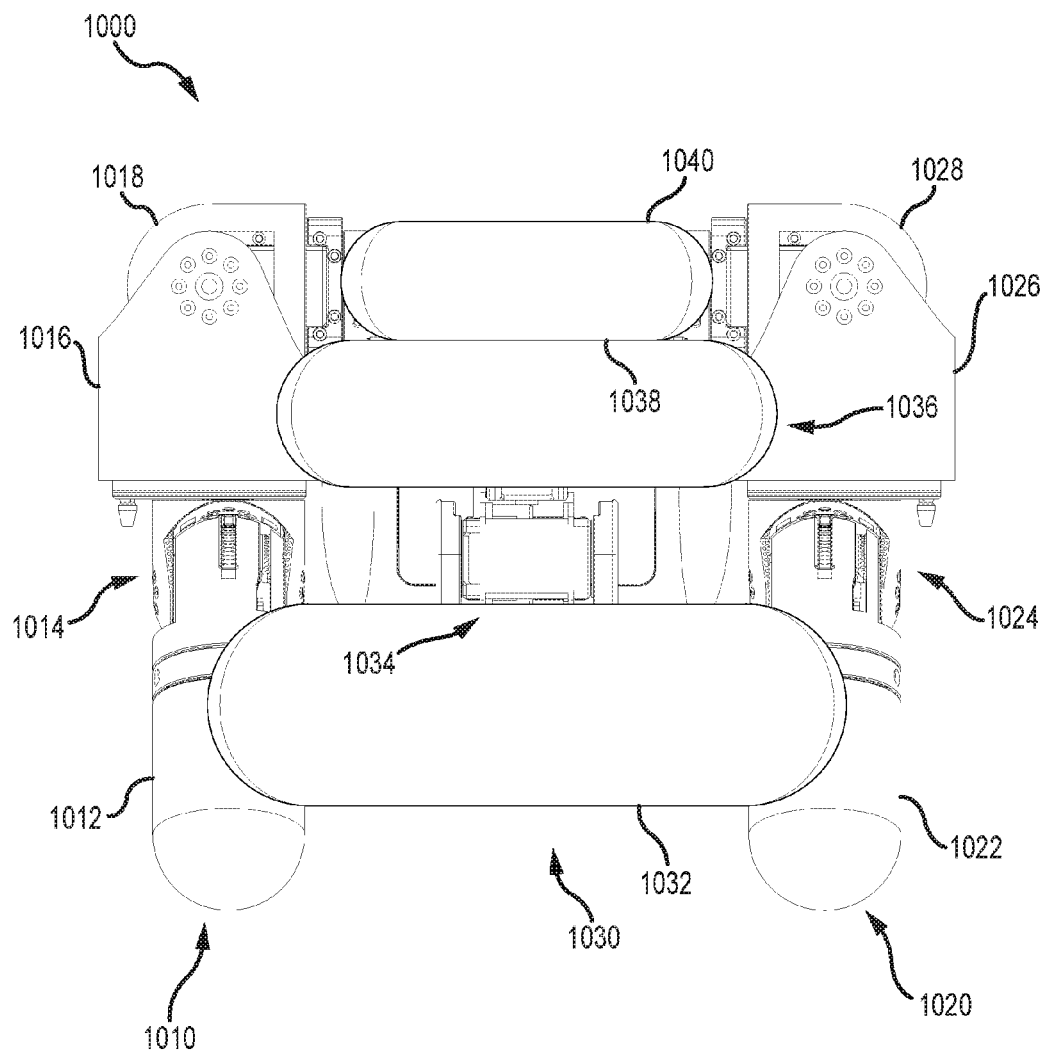
FIGS. 10A-10C illustrate front, side, and perspective front views of an upper body robot prototype fabricated using 3D printed modules for the links and conforming to the kinematic model of FIG. 9 and fitting within the mesh data of FIG. 6.
Figure 10B:
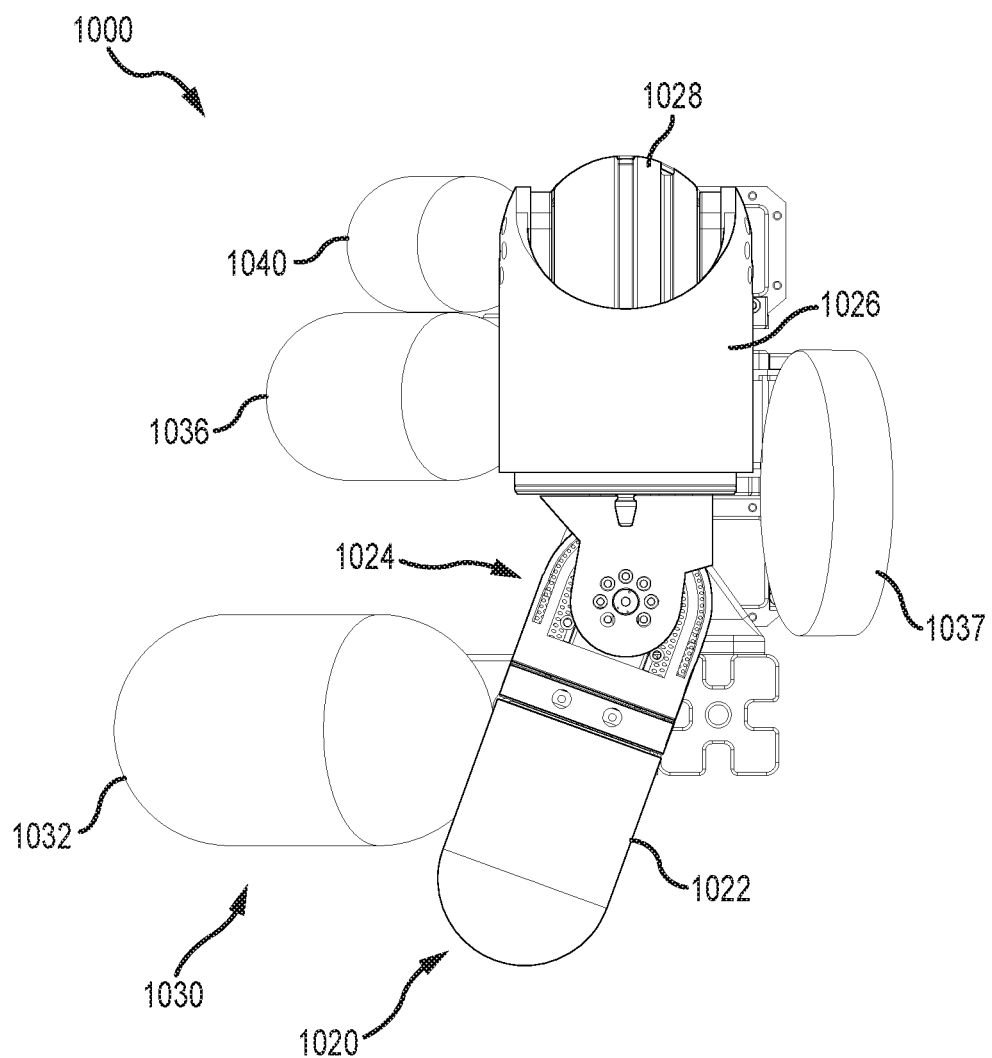
Figure 10C:
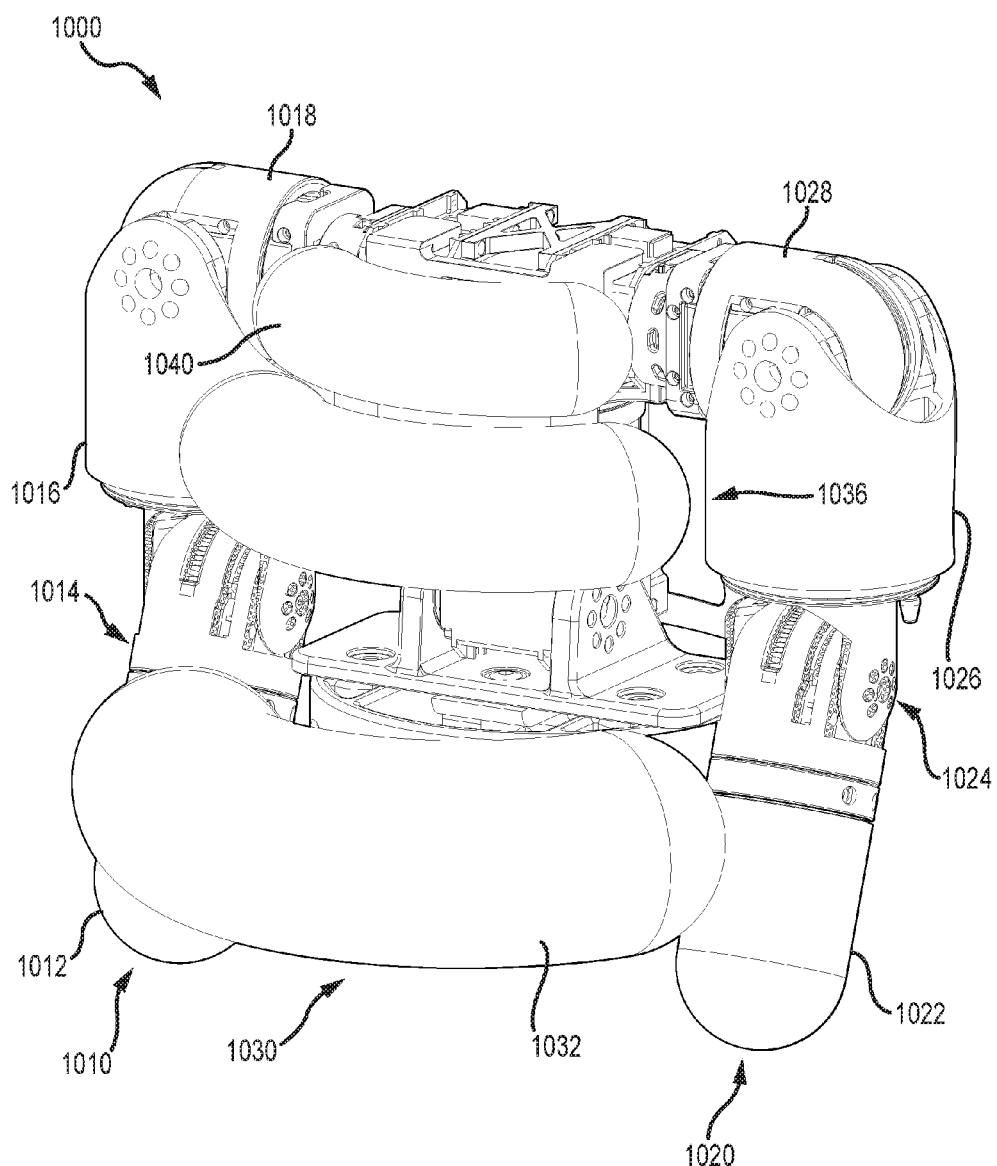

A humanoid upper body was designed and fabricated by the inventors using 3D printed modular components as well as off-the-shelf sensors and servos/actuators. The kinematic structure or model 900 for this robot is shown in FIG. 9. Considering various design constraints including those shown in FIG. 9, a durable 10-DOF robot 1000 was created, as shown in FIGS. 10A-10C, using air-filled, contact-sensing, soft skin modules on its links. The robot 1000 includes a left arm assembly 1010, a right arm assembly 1020, and a torso assembly 1030. The left arm assembly 1010 includes a forearm module or link 1012, an elbow joint 1014 (or upstream joint from the module 1012), an upper arm module or link 1016, and a shoulder joint 1018 (or upstream joint from the module 1016). The right arm assembly 1020 includes a forearm module or link 1022, an elbow joint 1024 (or upstream joint from the module 1022), an upper arm module or link 1026, and a shoulder joint 1028 (or upstream joint from the module 2026). The torso assembly 1030 includes a lower module 1032, an upstream vertebrae or torso joint 1034, a middle front module 1036 and a middle back module 1037, an upstream vertebrae or torso joint 1038, and an upper module 1040.

The modules are formed of a soft or deformable outer sidewall that encloses an interior cavity or space that is gas (or air) filled with a pressure sensor communicatively coupled to each cavity or interior space to sense changes in pressure (e.g., to sense contact with the module). The outer sidewalls may be formed of plastic, rubber, or other material that is flexible and supports non-plastic deformation (e.g., the outer sidewalls are configured to bounce back or return to their pre-contact or pre-deformation states once the compressive or contact forces are removed). Each module also includes a robot support element that is coupled to the edges of the outer sidewalls and is rigid (or more so than the outer sidewalls defining the air-filled cavities) to provide support and to mate the air-filled cavities with upstream or adjacent joints (e.g., may be or include bearings or elements adapted for mating with bearings) such that the links provided by the modules move with the upstream joints, which may be actuator or servo driven.

The robot 1000 has a 2-DOF waist 1034 with pitch and yaw joints. The shoulders 1018, 1028 are 3-DOF and the elbows 1014, 1024 are each 1-DOF. The range of motion for each joint and the mass of the body segments was found to be: (1) waist (2-DOF) with pitch and yaw had a range of motion of −3° to 28° pitch and −85° to 85° yaw and a mass of 764.1 grams; (2) shoulder (3-DOF) with pitch, roll, and yaw had a range of motion of −180° to 180° pitch, −95° to 70° roll, and −90° to 90° yaw and a mass of 2×534.9 grams; and (3) elbow (1-DOF) with pitch had a range of motion of −40° to 100° pitch and a mass of 2×185.3 grams. The total mass of the upper body was 2.2 kilograms, and the overall dimensions were 21.8×31.0×24.6 centimeters (H×W×D).

The 3D printed modules were created using a Stratasys Objet260 Connex multi-material 3D printer, which can print a single body part with both rigid and flexible features (e.g., for the support element and the interconnected flexible outer sidewall). The rigid materials used in the prototype robot 1000 were VeroWhitePlus and VeroClear. The flexible rubber-like material was TangoPlus. The modules were designed to be assembled with Dynamixel MX-series servos. The upper body of the robot 1000 contains eight soft skin modules: one at each hand as shown at 1012 and 1022, one on each upper arm as shown at 1016 and 1026, two on the chest as shown at 1036 and 1040, one at the waist as shown at 1032, and one on the back as shown at 1037. These soft skin modules each include a soft, air-filled cavity or interior space as provided by a deformable, soft outer sidewall. In the prototype, the sidewalls were provided by a 1.5 millimeter thick membrane of rubber or rubber-like material (which was 3D printed). The geometry of each module was cylindrical, hemispherical, and/or toroidal in general because these flexible forms tend to auto-inflate after being deflated by a contact or compressive force during human interaction with the robot 1000. Each module also includes an inner rigid frame that provided structural support and servo/actuator/joint mounting points for the modules.

Figure 11:
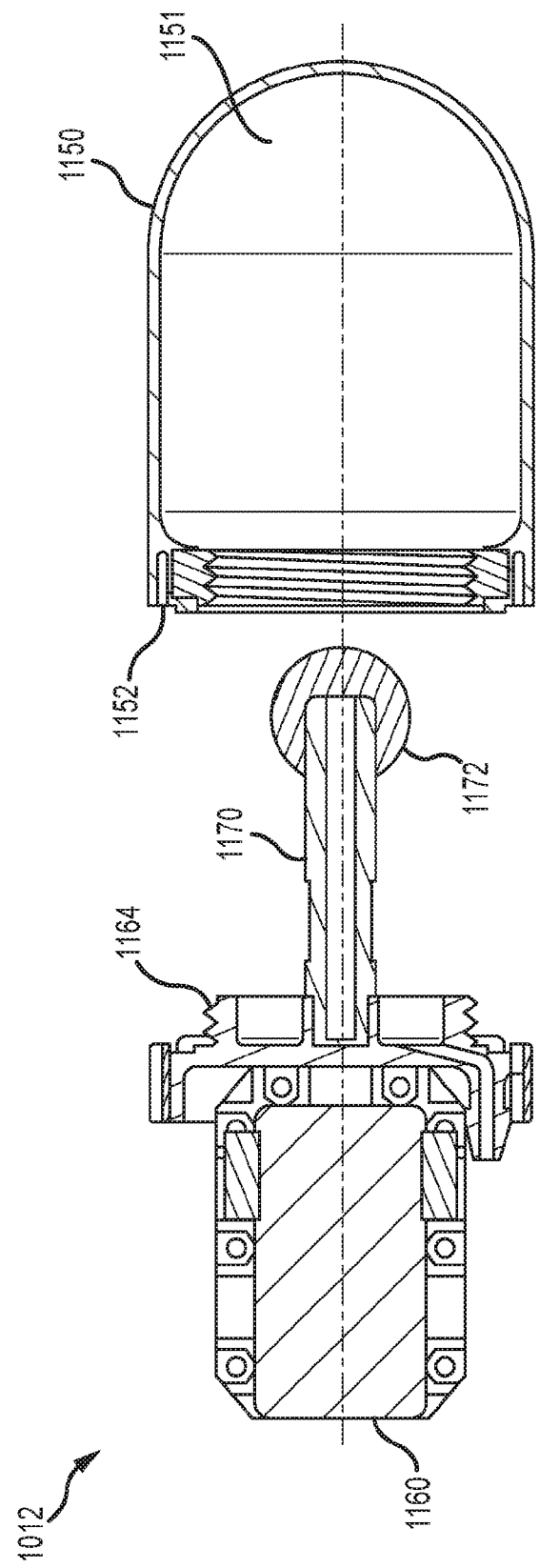
FIG. 11 illustrates an exploded sectional view of a forearm or hand (or end effector) module of the robot of FIGS. 10A-10C.

It may be useful to discuss in further detail an implementation of the forearm or end effectors 1012 and 1022 (or "hand") of the humanoid robot 1000 so as to provide an exemplary implementation of each of the modules/soft body parts of a robot according to the present description. An exploded cross sectional view of the forearm module 1012 is shown in FIG. 11. The module 1012 includes a flexible outer sidewall 1150 that defines or encloses a cavity (or void or interior space) that may be filled with a gas such as air. The module 1012 also includes a rigid support element 1152 coupled (in a gas permeable manner in some cases to provide a passageway for gas/air into the cavity 1151) to edges/ends of the sidewall 1150. The module 1012 includes a servo motor (or actuator) 1160 and threads 1164 for mating with the rigid support element 1152. The servo 1160 may act to drive rotation of the element 1152 and outer sidewall 1150 when no contact with the sidewall 1150 is sensed (e.g., based on sensed pressure of gas in the cavity 1151) and to allow the bearing/joint 1164 to freewheel or more freely rotate about the axis of the servo 1160 when contact with the sidewall 1150 is sensed (e.g., when pressure in the cavity increases above a predefined threshold pressure or a change in pressure trigger is exceeded). A rigid support of the outer sidewall 1150 is provided in the module 1012 through the combination of an elongated rod 1170 that extends outward from the coupler/joint 1164 into the cavity 1151 and a sphere or ball 1172 that may mate with an inner surface of the sidewall 1150 when the sidewall 1150 is deformed by contact (e.g., to assist in its returning to a non-contact or at-rest state/shape).

With the exploded cross sectional view of FIG. 11, it can be seen that the module 1012 is generally cylindrical in shape (e.g., with a 55 millimeter diameter used in the prototype) with a hemispherical tip provided by the outer sidewall 1150. The tip may extend out from the elbow joint 1164 by some desired length (with 120.5 millimeter length used in the prototype for the forearm link/module). Inside of the cavity 1151 is a rigid stick 1170 with a rubber-like ball 1172 on the end, which prevents the module 1012 from being deflated or deformed into a shape from which it cannot return. The servo motor 1160 may be a Dynamixel MX-28 and the support end/element 1152 is attached directly to the end 1164 of the servo motor 1160. On the servo-mounted end 1152 (where there is no room for air-filled features), a protective outer layer (e.g., a 3 millimeter (or other thickness) layer of rubber or rubber-like material) can be printed over the rigid frame. This use of soft material on segments where sensing does not occur can be used throughout the upper body robot 1000 helping to absorb impacts and providing a more consistent texture over the robot's body (e.g., make the entire body relatively soft).

With regard to the two upper arm modules 1016, 1036, each may be formed by surrounding another actuator/servo (e.g., a Dynamixel MX-28 servo) with an air-filled cavity defined by an outer sidewall printed or formed of rubber or rubber-like material (to be deformable when contacted but also to resiliently spring back to a pre-contact or non-contact (or at-rest) state or shape). The servo of the modules 1016, 1036 can be mounted inside of a rigid structural shell, which doubles as the inner wall of the surrounding air-tight cavity (or relatively air-tight cavity). This rigid shell extends to the output of its parent actuator. The outermost wall enclosing or defining the interior space/void or cavity and its connections to the rigid inner wall are made of flexible material (e.g., a membrane of rubber or rubber-like material that was 1.5 millimeters thick in the prototype formed using 3D printing).

As shown in FIGS. 10A-10C, there are three independent semi-toroidal shaped soft skin modules 1032, 1036, 1040 on the front of the robot 1000: two on the upper torso as shown at 1036 and 1040 and one on the pelvis as shown at 1032. Similar to the soft skin modules 1032, 1036, and 1040 on the front of the robot 1000, the air-filled module 1037 on the back senses contact from behind as well as oblique rear angles. Where the character mesh used to design the robot 1000 left little room, a tall, shallow elliptical toroid segment provided a large sensing area within a shallow space.

The modules of the robot 1000 were printed to include a standard tube fitting (e.g., a ⅛-inch or ¼-inch barbed tube fitting) for repeated connecting and disconnecting of an air hose and pressure sensor. Each joint may be adapted to include mechanical stops to limit the range of motion. The fabrication method for the robot 1000 includes use of a 3D printer to print (e.g., using PolyJet printing or the like to print) the soft skin modules 1012, 1016, 1022, 1026, 1032, 1036, 1037, and 1040. The 3D printing used in prototyping relied on a gel-like material to support overhanging part geometry as it printed each layer. This support material was UV-cured while printing, but it can be broken up and removed post-print using a pressure washer or other process. The cavities that will be air filled, therefore, were printed with an opening through which the support material was removed, and a cap for each module was also printed to seal the cavity once clean.

The hand/forearm and upper arm modules 1012, 1022 and 1016, 1026 were sealed using threaded caps. A threaded module's main body and cap were each printed with O-ring-like features that deform when tightened to create an airtight seal (or relatively air tight seal under non-contact conditions). On the torso, waist, and back, where threaded caps cannot readily fit, a simple cover was placed over the cavity opening and sealed using either epoxy or TangoPlus and left to cure under a high intensity UV light source.

The robot 1000 (or other implementations of the robot designs of the present description) may be implemented using 3D printed bearings including thrust bearings. For example, the robot's waist yaw joint is one of five joints where the link driven by the servo's output horn is unsupported by an idle horn on the opposite side of the servo. This leaves the servo's output shaft to bear the loads generated by robot motion and external forces. In these vulnerable locations, 3D printed bearings are employed in some implementations of the soft body robot to reduce the stress on the servo output shafts. The waist yaw servo has an unsupported output shaft and heavy masses on either end of the joint. During motions like sitting and walking or human interactions like being lifted, this joint's servo shaft will experience potentially damaging loads. A double direction tapered roller thrust bearing was implemented in one robot prototype in the waist yaw joint because of its ability to withstand high axial tensile and compressive loads and impacts. The tapered roller bearing can also endure moments and radial loads.

The inventors performed experiments on 3D printed thrust bearings using a simple tapered roller bearing model using multiple rigid materials, including VeroWhite, VeroClear, and Digital ABS, with bearing races printed using both matte and glossy surface finishes. Examples of these tested bearings 800 are shown in FIG. 8. The harder VeroWhite and VeroClear materials allowed for much smoother rolling initially and tended to get smoother as they were used and worn in over time. The rolling was smoothest when the bearing races were printed with a glossy surface finish. The roller assemblies were printed with a matte finish in each experiment so that the roller surfaces would have a consistent finish.

With this knowledge in mind, a prototype was designed and fabricated (e.g., 3D printed) for the waist yaw joint as a double direction tapered roller bearing. The prototype joint included upper and lower bearing race components, which bolt together to sandwich two roller assemblies. The roller assemblies share an adjacent central component, which provides the two inner bearing races and is fixed to the waist yaw servo body. In later prototypes, the upper and lower bearing race components were merged into a single component. The connected upper and lower bearing race components are directly driven by the yaw servo output shaft. Due to the eccentric location of the output axis on the servo case and the small desired diameter of the yaw bearing assembly, the bottom roller assembly cannot form a complete circle and thus limits the range of motion of the waist yaw joint.

Figure 12:
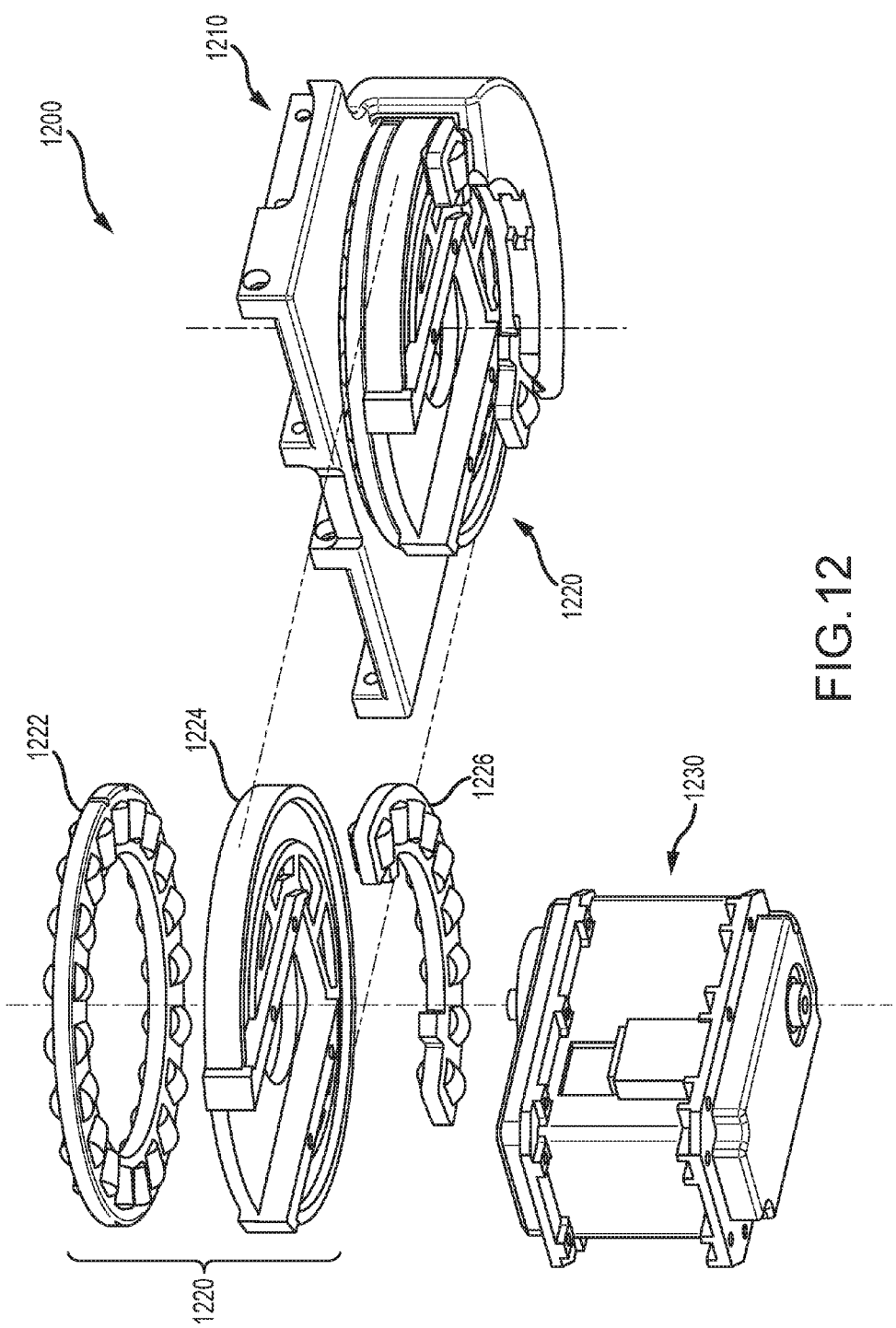
FIG. 12 illustrates an exploded view of a waist joint that may be implemented using a double direction tapered roller thrust bearing.

FIG. 12 provides an exploded view of a waist joint 1200 that may be implemented using a double direction tapered roller thrust bearing design. The joint assembly 1200 includes a waist yaw servo 1230 affixed at the servo output shaft to a bearing housing 1210 that is also used to house and support a bearing system/assembly 1220. The assembly 1220 includes a lower roller assembly 1226, a central bearing race component 1224, and an upper roller assembly 1222. In one prototype, the overall diameter of the bearing module 1200 was 90 millimeters and the height was 24.5 millimeters. The mass of the prototype bearing was 102.6 grams. The range of motion of the prototyped designs was plus/minus 85°. The diameter of the assembly/module 1200 was reduced in one prototype by combining the upper and lower bearing races into a single part (which can be printed using a 3D printer), eliminating the need for hardware fasteners. The size of the conical rollers was also reduced in this prototype allowing room for more rollers.

The upper roller assembly 1222 has 20 rollers spaced 18° apart. The lower roller assembly 1226, which is not a full circle, includes 9 rollers with the same 18° spacing. Adding more rollers further distributes loads and increases the operating smoothness of the bearing. In FIG. 12, the joint 1200 is viewed from the lower rear. The upper and lower race component 1224 is driven by the output of the servo 1220. The central race component 1224 is fixed to the yaw servo body. The upper and lower roller assemblies 1222 and 1226 can be 3D printed as assembled parts and are unable to be disassembled. The bearing cage captures each roller in a conical cavity offset from the conical roller surface (e.g., by 0.2 millimeters or the like). This clearance was determined by printing bearings with varying clearances and evaluating their ability to contain the rollers, ability to be reliably printed, ease of removing the initial support material, and ability to roll smoothly. Rollers printed with a clearance larger than about 0.3 millimeters tend to fall out of the cage easily or jam. Rollers printed with less than 0.1 millimeter clearance sometimes print fused to the bearing cage and are unable to roll. When not fused, these small clearances create very narrow volumes of support material which are difficult to access and break free by hand. Roller assembly clearances of 0.2 millimeters are printed reliably, support material can be easily broken free by hand and washed away, and the rollers roll well within the cage.

After developing a satisfactory bearing module (as shown with assembly 1200), friction was further reduced using a graphite-based, dry lubricant. The roller assemblies were coated with Blaster 8-GS Graphite Spray. For each application of the lubricant, the rollers were rotated in the cage to ensure a consistent coating around each of the roller's conical surfaces. The use of this dry lubricant reduces the friction within the roller assembly and, therefore, reduces the friction between the servo and bearing module outputs.

Thrust bearing validation was performed on the 3D printed bearing (e.g., bearing assembly/joint 1200 of FIG. 12) used for the robot's waist yaw joint, which as discussed above was implemented as a double direction tapered roller thrust bearing. Due to the offset location of the shoulder pitch motors, most forces experienced by the bearing produce a moment that causes the two bearings to share the load. The bearing assembly distributes these loads and moments down to the servo case, as opposed to the servo output shaft. Finite element analysis also was used to validate the effect of the thrust bearing in reducing stress on the servo output shaft.

A simplified loading simulation of the double direction thrust bearing was compared to a similar simulation without the bearing. With a fixed servo output shaft, the assembly was loaded using 50 Newton compressive and tensile loads applied at the shoulder pitch servos (e.g., a pair of servos mounted on upper surfaces of the housing 1210 opposite the servo 1230 as shown in FIG. 12). In these two loading scenarios, the stress concentrations caused by sagittal bending was seen on the front and back of the servo shaft. The double direction thrust bearing reduces the maximum stress in the shaft by distributing forces down to the rigid mounting flanges of the waist yaw servo case/housing (e.g., housing 1210 in FIG. 12).

Figure 13A:
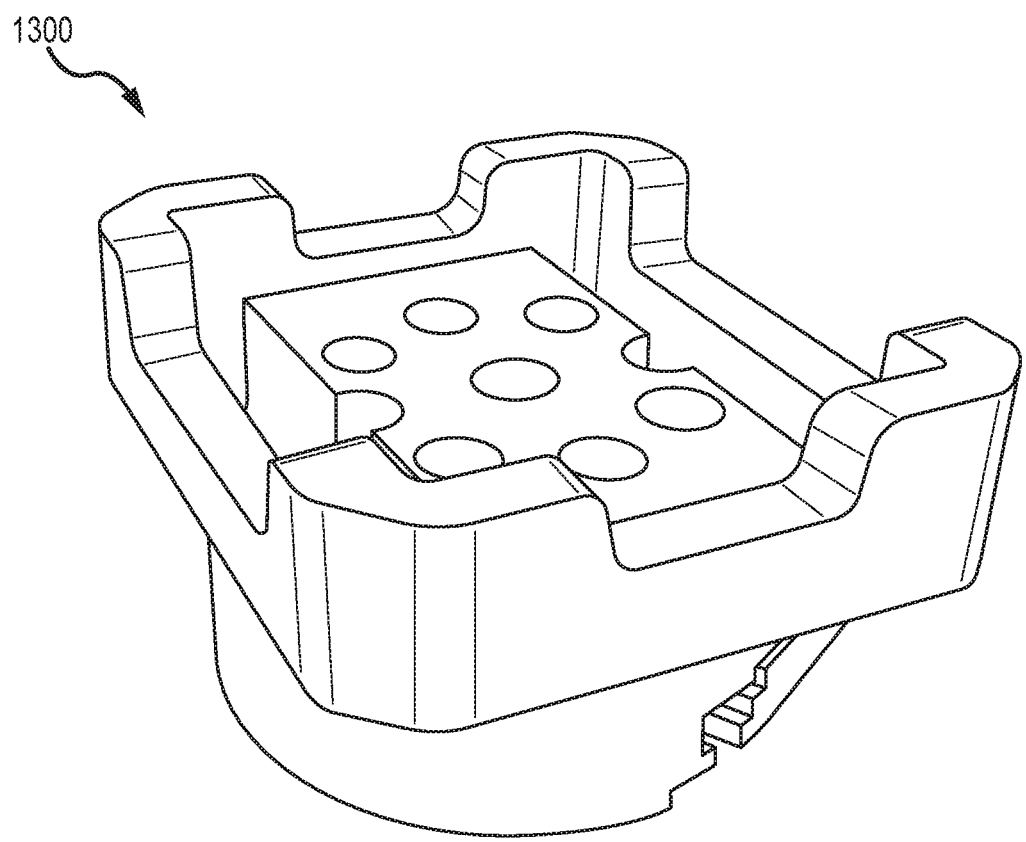
FIGS. 13A and 13B illustrate a perspective view of a shoulder friction bearing (or joint) and a cross sectional view of a shoulder friction bearing, respectively.
Figure 13B:
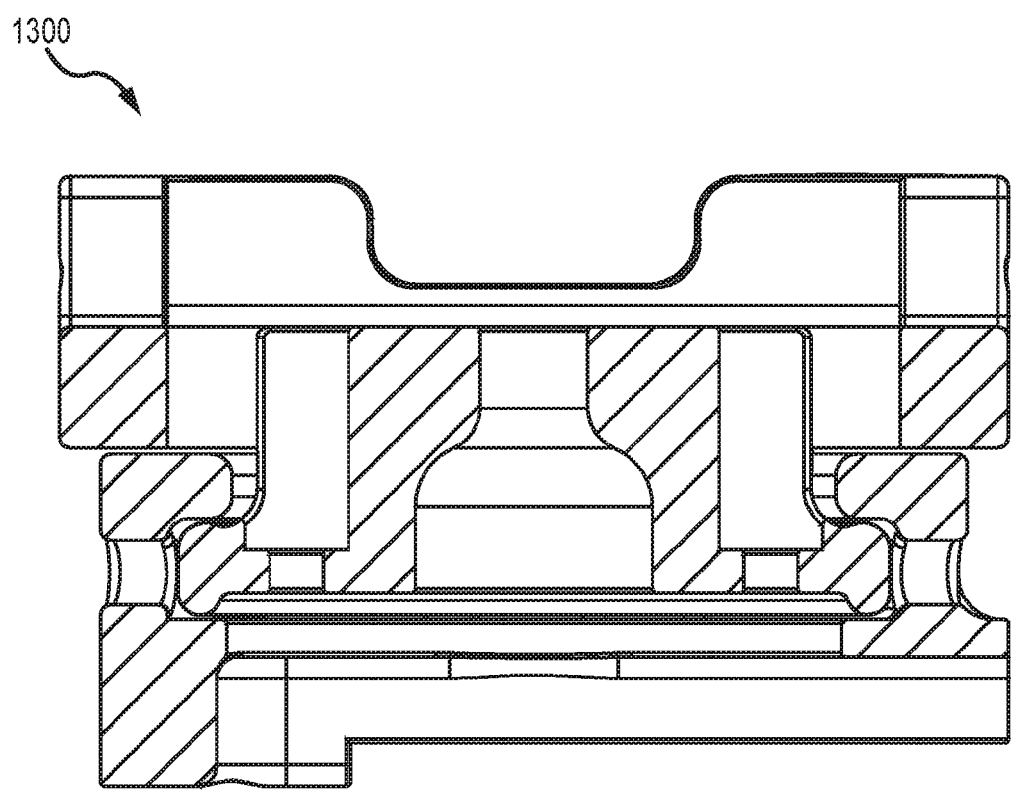
Figure 14A:
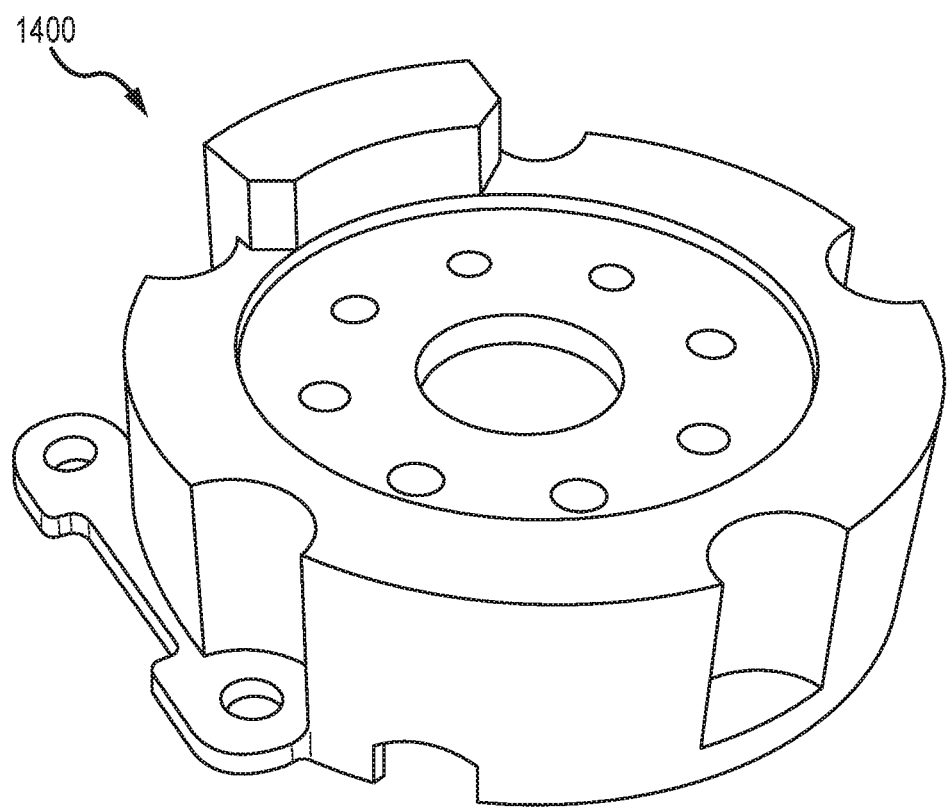
FIGS. 14A and 14B illustrate a perspective view and a cross sectional view, respectively, of an elbow friction bearing.
Figure 14B:
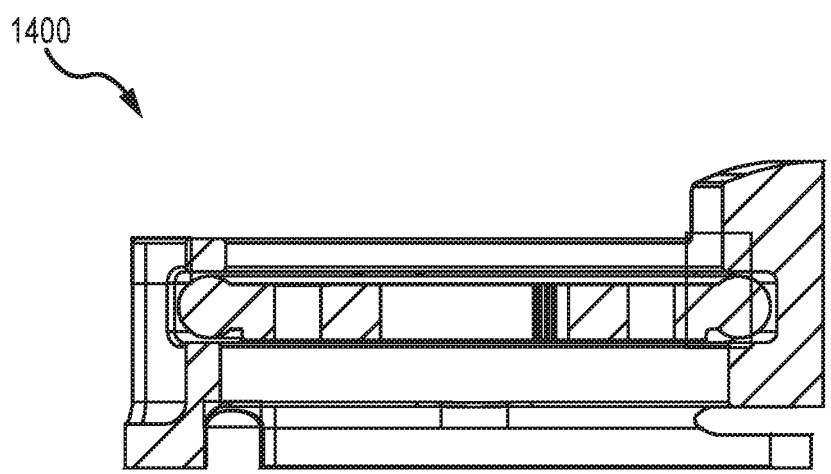

With regard to friction bearings in the robot, there are four other servo output shafts with no supporting idle horns: one at each shoulder and one at each elbow. In these small spaces where a roller bearing may not fit, friction bearings such as the shoulder friction bearing 1300 shown in FIGS. 13A and 13B and such as the elbow friction bearing 1400 shown in FIGS. 14A and 14B, were used to limit stress on the servo output shafts. The role of the friction bearing is to support the servo output shaft when loaded to prevent excessive deflection and stress. Each friction bearing has two main parts. The inner component of the bearing, which includes a disk that attaches directly to the servo horn, is captured by the outer component of the bearing. The inner and outer components are shown more clearly in the cross sectional views in FIGS. 13B and 14B. The outer component attaches directly to the servo's case, providing two rigidly supported bearing surfaces. For rigidity and compactness, these two components are printed using a 3D printer as one assembled module that cannot be disassembled in some robot embodiments.

Under normal loading, the inner disk component of the friction bearing 1300, 1400 is in its neutral position and does not contact the bearing surfaces. In this neutral configuration, a clearance (e.g., 0.2 millimeters) exists in the axial direction between the inner disk's toroidal edge and each of the outer component's bearing surfaces. Only when the servo shaft is deflecting do these bearing components make contact. When a joint experiences a force or moment large enough to deflect to the limit, the joint may still operate, albeit with increased rotational friction.

Figure 15A:
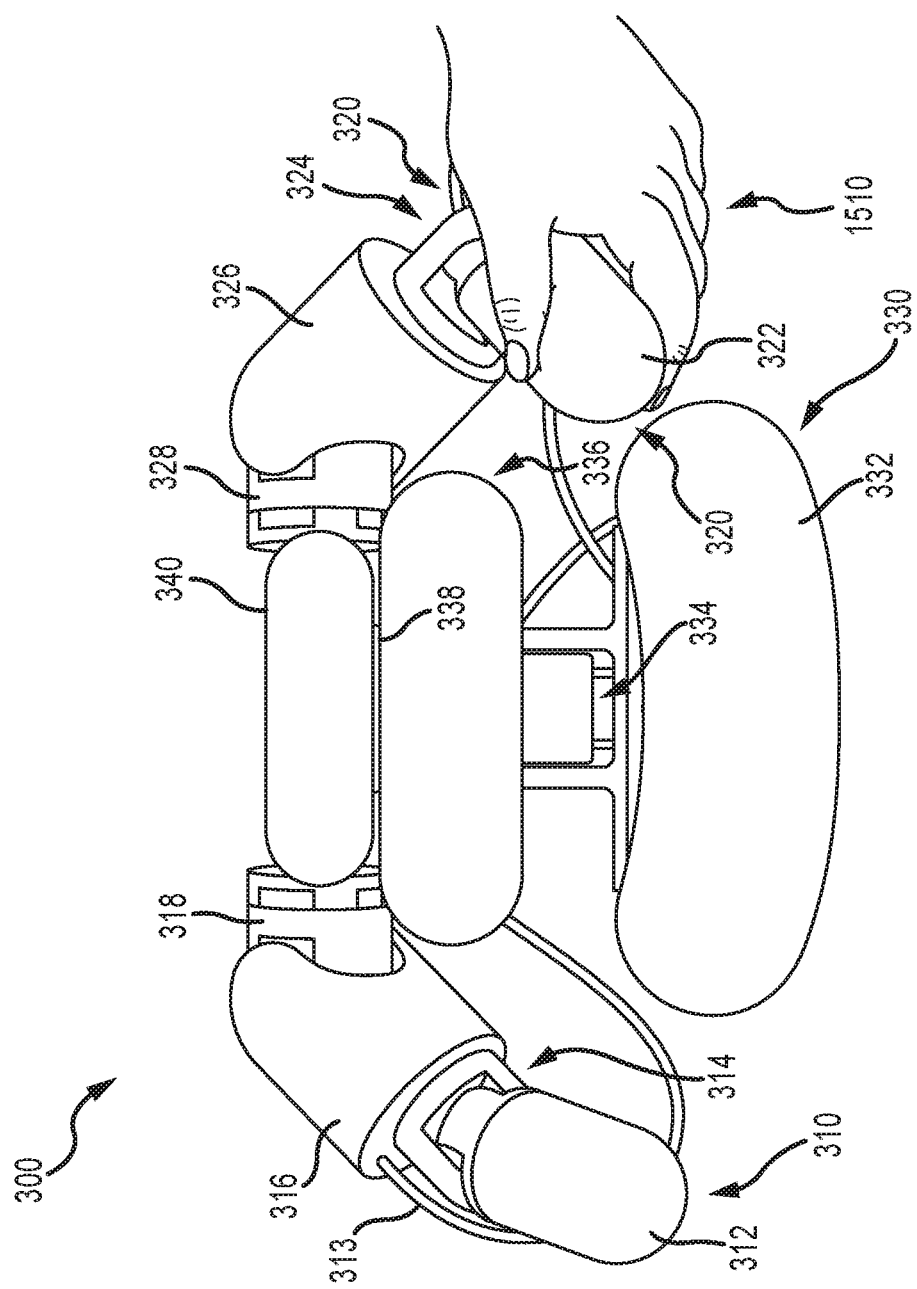
Figure 15B:
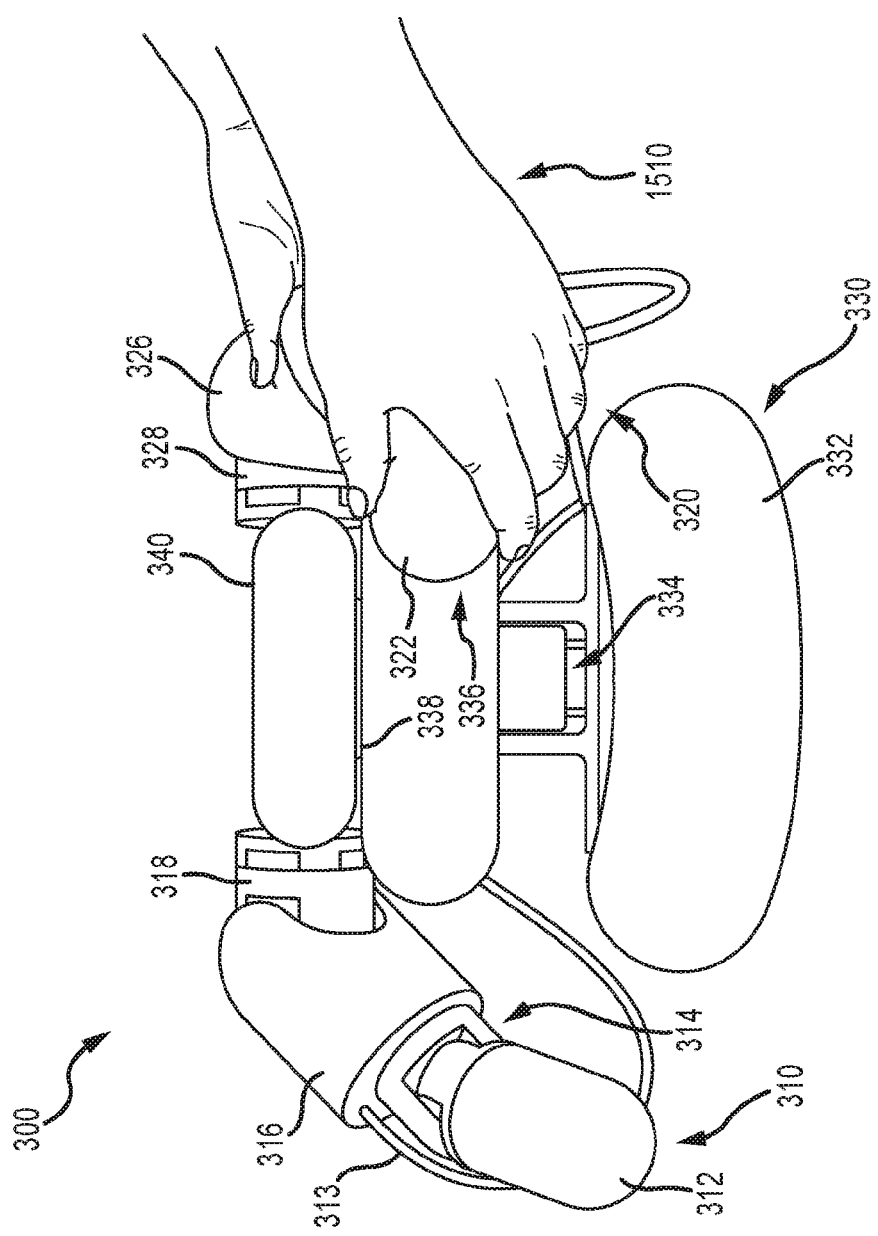
Figure 15C:
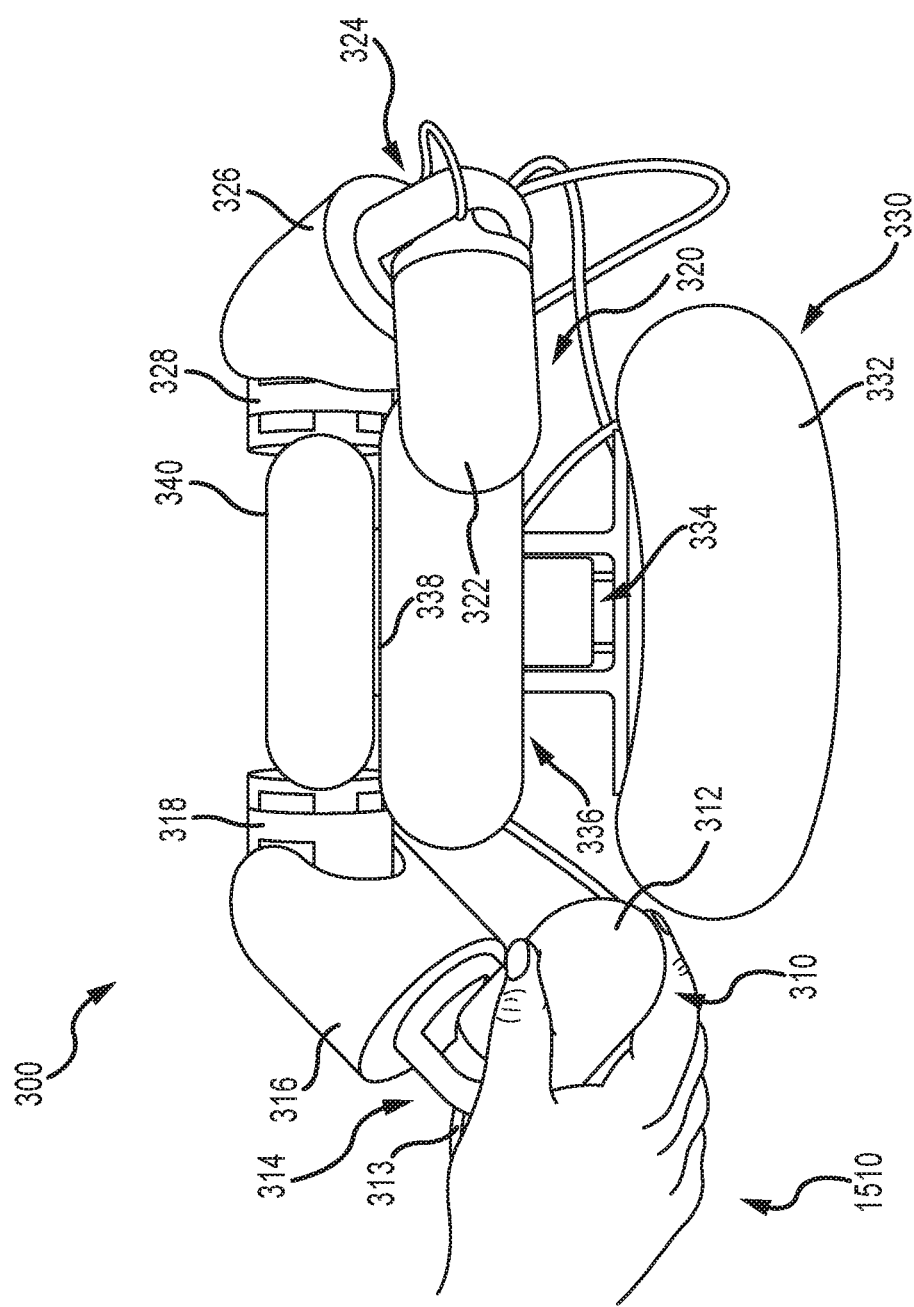
Figure 15D:
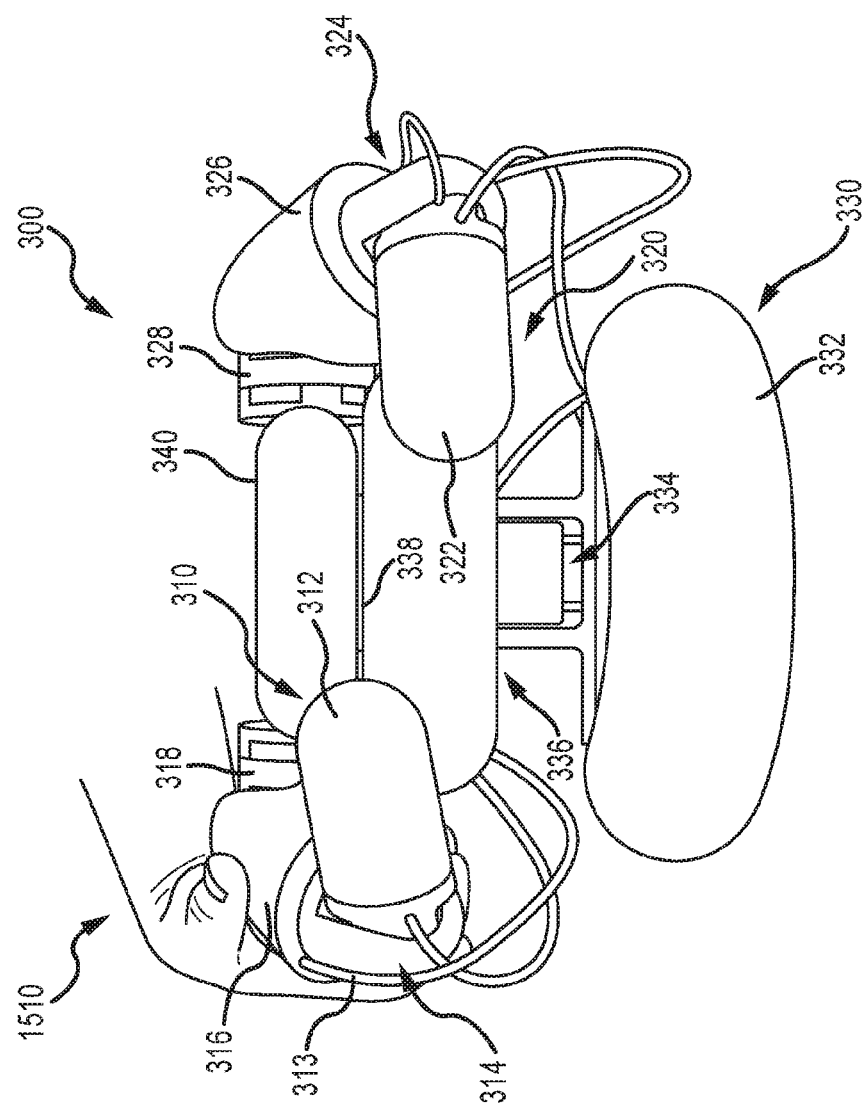
Figure 15F:
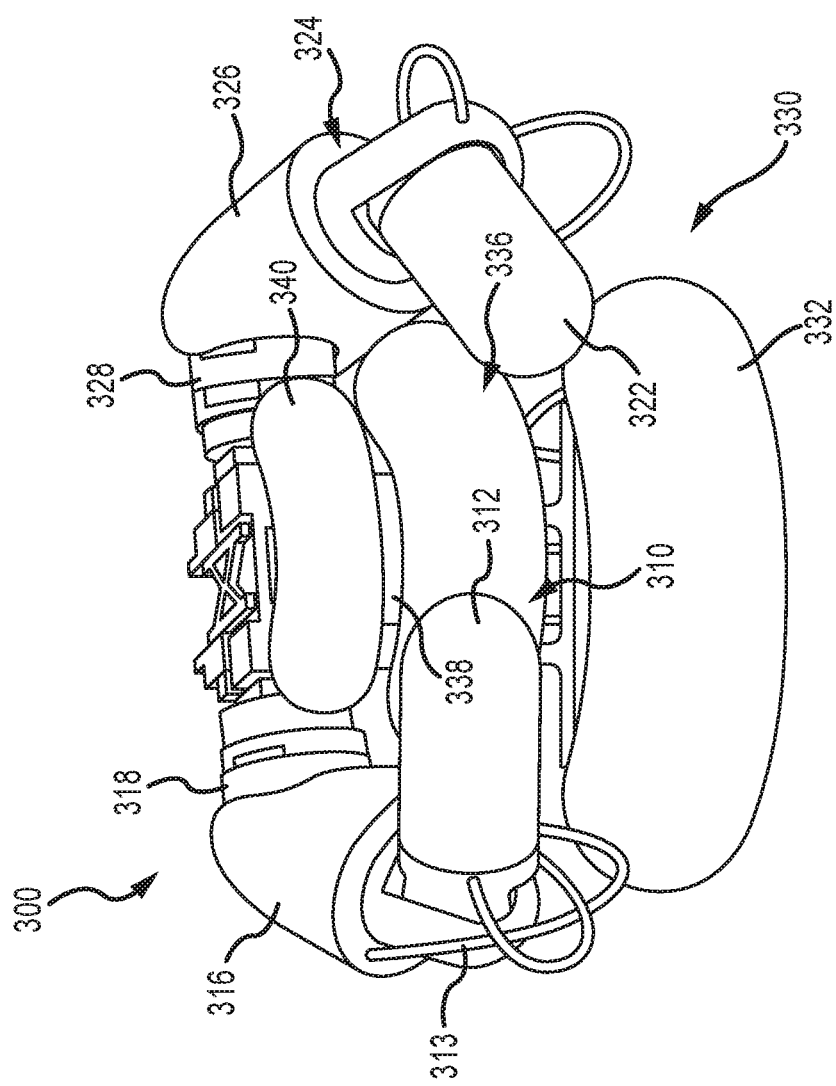

FIGS. 15A-15F show the robot 300 of FIG. 3 as it is being contacted and manipulated by a human operator 1510. In FIG. 15A, the human operator 1510 applied a compressive or squeezing force on the left forearm, which is sensed based on a pressure change in the cavity of the forearm. In FIG. 15B, the upstream joint is operated in response to the contact to freewheel to allow the human operator 1510 to rotate/position the forearm module or soft body part. In FIGS. 15C and 15D, the human operator 1510 is shown to take similar actions with the right forearm and right upper arm module (or soft body parts) and to rotate upstream joints that are operated/controlled to be able to freewheel/rotate with little resistance to movement by the human operator 1510. FIGS. 15E and 15F show the human operator applying compressive/contact forces to torso or chest soft body parts/modules and then rotating the robot about upstream waist and/or vertebrae joints to pose the robot in a new pose.

FIGS. 15A-15F illustrate the robot 300 during an experimental run or use of the robot 300 and its controller. Each air-filled link on the robot was a soft skin module as described above that was connected to a pressure sensor using a flexible tube. The module is sealed (with a leak resistant seal providing an air passageway under contact) and held its shape when connected. The pressure sensors were connected to A/D channels of the servo motor controller board (or robot controller as labeled in FIG. 1). The pressure sensor used was a MPX5500DP Freescale air pressure sensor, and the controller was an OpenCM9.04 board with an OpenCM485EXP expansion board. Control commands were sent to the servos/actuators every 10 milliseconds using Transistor-transistor Logic (TTL).

A simple user interface for human and robot interaction is implemented in the control system to verify the hardware. The interface provided "grab and move" functionality for easily posing the robot. In this operating mode or function, desired joint angles are the angles measured in the previous control period. The joint controller holds the servo motor for a given link at its desired angle while the pressure of its corresponding soft skin module ($P_i$) is less than a threshold pressure ($P_{threshold}$). If $P_i$ becomes larger than $P_{threshold}$, the parent joint is made powerless by the joint controller, and this control process was shown in FIGS. 15A-15F. In FIG. 15A, the robot's left forearm is grabbed by a human causing the left elbow joint to become powerless and move freely. FIGS. 15B, 15C, 15D, and 15E show that the implemented function works for posing each of the air-filled links. In FIG. 15F, the robot maintains the final pose created by the physical interaction with the human.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the description teaches that a joint that is "coupled" with a joint or support element covered by a soft body has its control modified based on pressure measurement. This may be a direct coupling such as when the joint whose control is modified is an adjacent joint (upstream or downstream) or may be indirect coupling when the joint whose operation is modified is further upstream or downstream.

For example, the control method implemented by the robot controller or joint controller involved making a parent, an upstream, or a downstream joint powerless to allow it to freely rotate (or freewheel) in response to a certain change in pressure being sensed. In other embodiments, the pressure sensor data and/or other sensor data may be processed to determine a direction of the contact or compressive forces being applied to one or more of the soft body parts or modules. Then, the joints may be controlled to react to these directional forces. In other cases, the amount of pressure change may be measured/determined by the controller and the joints/servos may be controlled based on this pressure change (e.g., not simply be powered off to move freely). In one case, the gain could be controlled to be inversely proportional to the detected pressure change.

We claim:

1. A robot for human interaction, comprising:
a robot controller including a joint control module;
a link comprising a rigid support element and a body segment coupled to the rigid support element, wherein the body segment includes an outer sidewall enclosing an interior space;
a pressure sensor sensing pressure in the interior space of the link; and
a joint coupled to the rigid support element,
wherein the robot controller operates the joint based on the pressure sensed by the pressure sensor,
wherein the interior space is filled with a fluid,
wherein the pressure is a pressure of the fluid in the interior space, and
wherein the robot controller operates the joint based on the pressure when the pressure exceeds a predefined threshold pressure value or when a change greater than a predefined pressure change is identified by the controller.

2. The robot of claim 1, wherein the robot controller modifies operation of the joint, when the pressure exceeds a predefined threshold pressure value or when a change greater than a predefined pressure change is identified by the controller, from a first operating state with a servo moving or positioning the joint to a second operating state with the servo operating to allow the joint to be moved or positioned in response to outside forces applied to the link.

3. The robot of claim 1, wherein the joint is upstream of the link in the robot.

4. The robot of claim 1, wherein the outer sidewall is flexible whereby the interior space has a first volume in a pre-contact state and a second volume less than the first volume in a second state in which a contact force is applied to the outer sidewall.

5. The robot of claim 4, wherein the link further includes a deformation control member extending from the rigid support element to be positioned within the interior space to limit a magnitude of deformation of the outer sidewall.

6. The robot of claim 1, wherein the link is fabricated as a single unit using a three dimensional (3D) printer.

7. The robot of claim 6, wherein the single unit includes a threaded cap and an O-ring-like component that seals the interior space when the threaded cap is tightened during assembly of the robot.

8. A robot for human interaction, comprising:
a robot controller including a joint control module;
a link comprising a rigid support element and a body segment coupled to the rigid support element, wherein the body segment includes an outer sidewall enclosing an interior space;
a pressure sensor sensing pressure in the interior space of the link; and
a joint coupled to the rigid support element,
wherein the robot controller operates the joint based on the pressure sensed by the pressure sensor,
wherein the link is fabricated as a single unit, and
wherein the rigid support element includes a connector for the pressure sensor providing a passageway to the interior space.

9. A robot for human interaction, comprising:
a robot controller including a joint control module;
a link comprising a rigid support element and a body segment coupled to the rigid support element, wherein the body segment includes an outer sidewall enclosing an interior space;
a pressure sensor sensing pressure in the interior space of the link; and
a joint coupled to the rigid support element,
wherein the robot controller operates the joint based on the pressure sensed by the pressure sensor, and
wherein the joint includes one of a thrust bearing and a friction bearing fabricated as a single unit.

10. The robot of claim 9, wherein the thrust bearing is configured as a double direction thrust bearing and includes a lower roller cage assembly arranged in an arc and containing a number of rollers, the number of rollers being less than a number of rollers included in a corresponding upper roller cage assembly arranged in a full circle.

11. A robot, comprising:
a plurality of body segments; and
a set of servo-driven joints interconnecting the body segments,
wherein one or more of the body segments includes a fluid-filled void enclosed by a sidewall,
wherein the sidewall comprises a membrane of a flexible material, and
wherein each of the body segments further comprises a rigid support element coupled to an edge of the sidewall and coupled to one of the servo-driven joints; and
a pressure sensor in communication with the fluid-filled void of each of the body segments operating to sense a pressure in each of the body segments,
a controller comparing the pressure in each of the body segments with a predefined threshold value or measuring a change in pressure in the body segments based on the pressure and based on the comparing or the measuring, modifying operations of at least one of the servo-driven joints.

12. The robot of claim 11, wherein the modifying of the operations of the at least one of the servo-driven joints comprises powering off a servo or allowing a servo to freewheel.

13. The robot of claim 12, wherein the at least one of the servo-driven joints is a parent joint for one of the body segments having a pressure exceeding the predefined threshold value or having a change in pressure exceeding a predefined maximum pressure change value.

14. The robot of claim 11, wherein the body segments are printed using a 3D printer and the flexible material is a rubber, a plastic, or a rubber-like material.

15. The robot of claim 14, wherein the robot is configured to have a predefined body shape and wherein the body segments are selected to each have an outer shape defined by one of a plurality of primitive modules.

16. The robot of claim 15, wherein the outer shapes of the primitive modules are selected from the group consisting of a donut shape, a cylinder, and a cylinder with a round end.

17. A method of controlling operation of a robot, comprising:
first transmitting a control signal to operate a joint upstream of a link in a first operating state, wherein the link includes a rigid support element coupled to the joint and a cavity enclosed by a sidewall affixed to the rigid support element;
measuring a pressure of a fluid in the cavity;
based on the measured pressure, determining when a contact force is being applied to the sidewall; and
when the contact force is determined, second transmitting a control signal to operate the joint upstream of the link in a second operating state differing from the first operating state, wherein the second operating state comprises powering off an actuator or servo in the joint.

18. The method of claim 17, further comprising measuring a second pressure in of the fluid in the cavity, determining when the contact force is removed from the sidewall, and, where the contact force is determined removed, third transmitting a control signal to operate the joint upstream of the link in a third operating state differing from the second operating state.

19. The method of claim 17, wherein the robot is a humanoid robot and the link comprises a forearm link, an upper arm link, a torso link, a back link, or a chest link.

* * * * *